US012119722B2

(12) United States Patent
Walter et al.

(10) Patent No.: US 12,119,722 B2
(45) Date of Patent: Oct. 15, 2024

(54) DRIVE MOTOR WITH A CONNECTION DEVICE

(71) Applicant: Festool GmbH, Wendlingen (DE)

(72) Inventors: Bernd Walter, Neuhausen a.d.F. (DE); Florian Goos, Stutensee (DE); Volker Barth, Aichwald (DE)

(73) Assignee: Festool GmbH, Wendlingen (DE)

( * ) Notice: Subject to any disclaimer, the term of this patent is extended or adjusted under 35 U.S.C. 154(b) by 430 days.

(21) Appl. No.: 17/606,879

(22) PCT Filed: Apr. 30, 2020

(86) PCT No.: PCT/EP2020/062056
§ 371 (c)(1),
(2) Date: Oct. 27, 2021

(87) PCT Pub. No.: WO2020/221870
PCT Pub. Date: Nov. 5, 2020

(65) Prior Publication Data
US 2022/0209614 A1 Jun. 30, 2022

(30) Foreign Application Priority Data
May 2, 2019 (DE) .......................... 102019111335.0

(51) Int. Cl.
*H02K 3/52* (2006.01)
*H02K 7/08* (2006.01)
(Continued)

(52) U.S. Cl.
CPC ............. *H02K 3/522* (2013.01); *H02K 7/083* (2013.01); *H02K 7/145* (2013.01);
(Continued)

(58) Field of Classification Search
CPC .. B25F 5/00; H02K 15/0062; H02K 15/0068; H02K 21/16; H02K 2203/06; H02K 3/50;
(Continued)

(56) References Cited

U.S. PATENT DOCUMENTS

| 6,600,244 B2* | 7/2003 | Okazaki ................. H02K 3/522 |
| | | 310/71 |
| 2010/0141067 A1* | 6/2010 | Kitagawa ............... H02K 3/522 |
| | | 310/71 |

(Continued)

FOREIGN PATENT DOCUMENTS

| DE | 102011120985 A1 | 6/2013 |
| DE | 102012013740 A1 | 1/2014 |

(Continued)

OTHER PUBLICATIONS

SK-286963-B6, Boischio I, all pages (Year: 2009).*
Chinese Office Action of Apr. 28, 2023.
Japanese Office Action dated Mar. 5, 2024.

*Primary Examiner* — Naishadh N Desai
(74) *Attorney, Agent, or Firm* — Hoffmann & Baron, LLP

(57) ABSTRACT

A drive motor for a suction tool (400) or a machine tool in the form of a hand-held power tool (200, 300) or a semi-stationary machine tool. The drive motor (20, 120) has a stator (80) with an excitation coil assembly (86) and a rotor (40, 140) with a motor shaft (30, 130) which is rotatably mounted on the stator or relative to the stator (80) about a rotational axis (D) by means of a bearing assembly (24A), and the drive motor (20, 120) has a connection device (100) for electrically connecting the drive motor to an energizing device (206, 306) for energizing the excitation coil assembly (86). The connection device (100) has a main part (103) for securing to the stator (80) and a receiving arm (108) which protrudes from the main part (103), a conductor receiving area (107) being formed between the main part and the (Continued)

receiving arm for at least one electric coil conductor (88) of an excitation coil (87) of the excitation coil assembly (86). The connection device (100) has a connection contact region (101) for electrically connecting a connection line (15) for connecting to the energizing device (206, 306).

22 Claims, 8 Drawing Sheets

(51) Int. Cl.
*H02K 7/14* (2006.01)
*H02K 15/00* (2006.01)
*H02K 21/16* (2006.01)
*B25F 5/00* (2006.01)

(52) U.S. Cl.
CPC ......... *H02K 15/0062* (2013.01); *H02K 21/16* (2013.01); *B25F 5/00* (2013.01)

(58) Field of Classification Search
CPC ........ H02K 3/522; H02K 5/225; H02K 7/083; H02K 7/145; B22D 41/54
See application file for complete search history.

(56) References Cited

U.S. PATENT DOCUMENTS

| | | | |
|---|---|---|---|
| 2015/0069864 A1 | 3/2015 | Nagahama et al. | |
| 2015/0188377 A1* | 7/2015 | Kim | H02K 29/03 |
| | | | 417/415 |
| 2018/0115215 A1* | 4/2018 | Miwa | H02K 11/33 |

FOREIGN PATENT DOCUMENTS

| | | | | |
|---|---|---|---|---|
| DE | 202016106633 U1 | 12/2016 | | |
| DE | 102016211230 A1 | 12/2017 | | |
| EP | 2849316 A2 | 3/2015 | | |
| JP | H11114674 A | 4/1999 | | |
| JP | 2014-033547 A | 2/2014 | | |
| JP | 2017-158250 A | 9/2017 | | |
| JP | 2018-068063 A | 4/2018 | | |
| SK | 286963 B6 * | 8/2009 | ............. | H01R 39/32 |
| WO | 99/049554 A1 | 9/1999 | | |

* cited by examiner

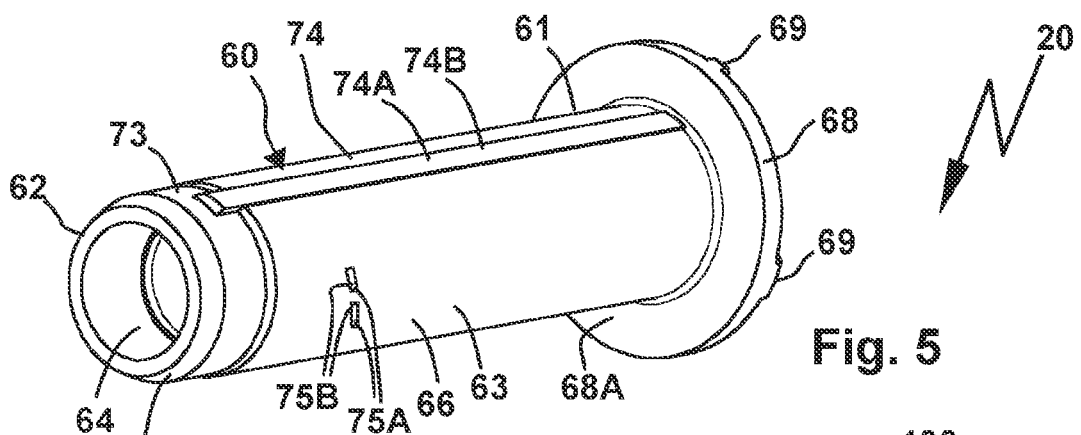
Fig. 5
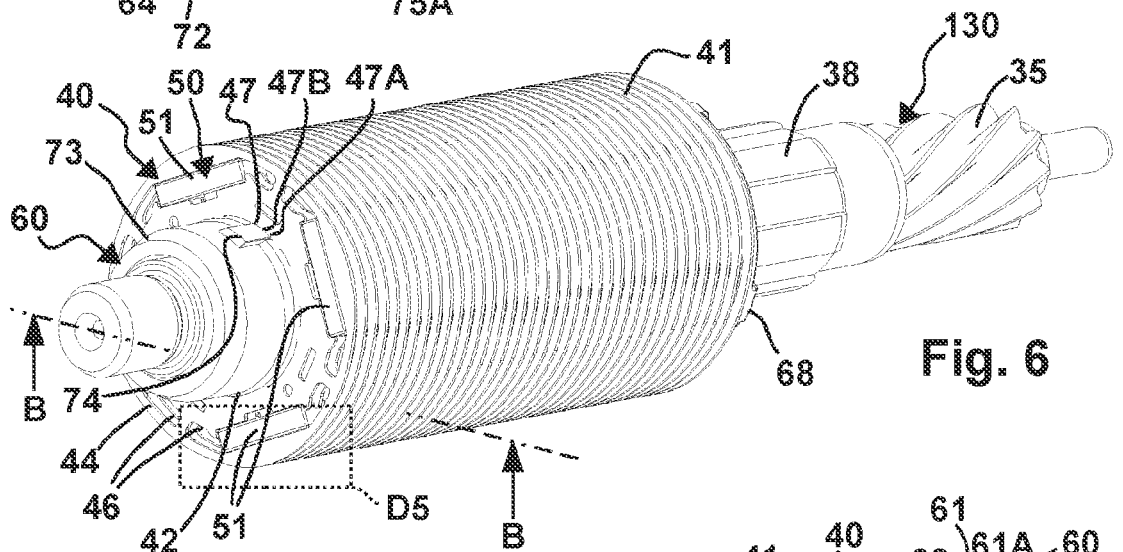
Fig. 6
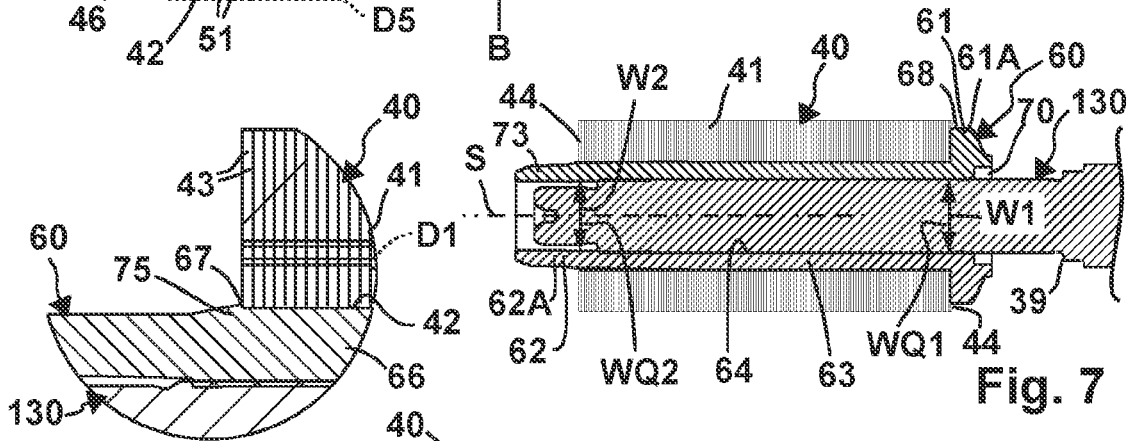
Fig. 7
Fig. 9
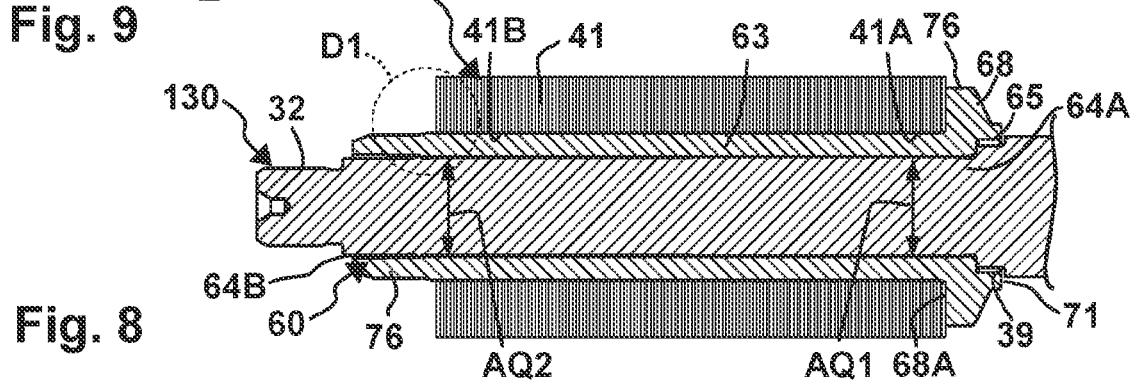
Fig. 8

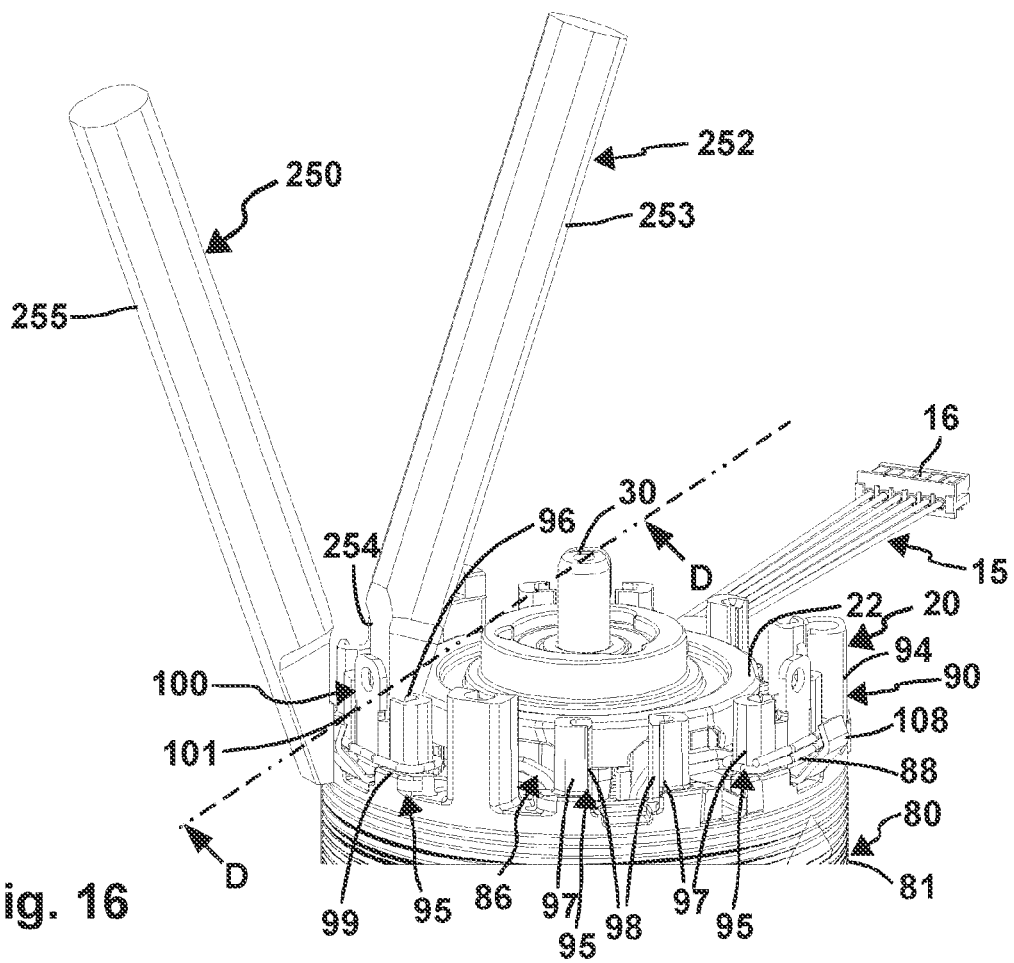
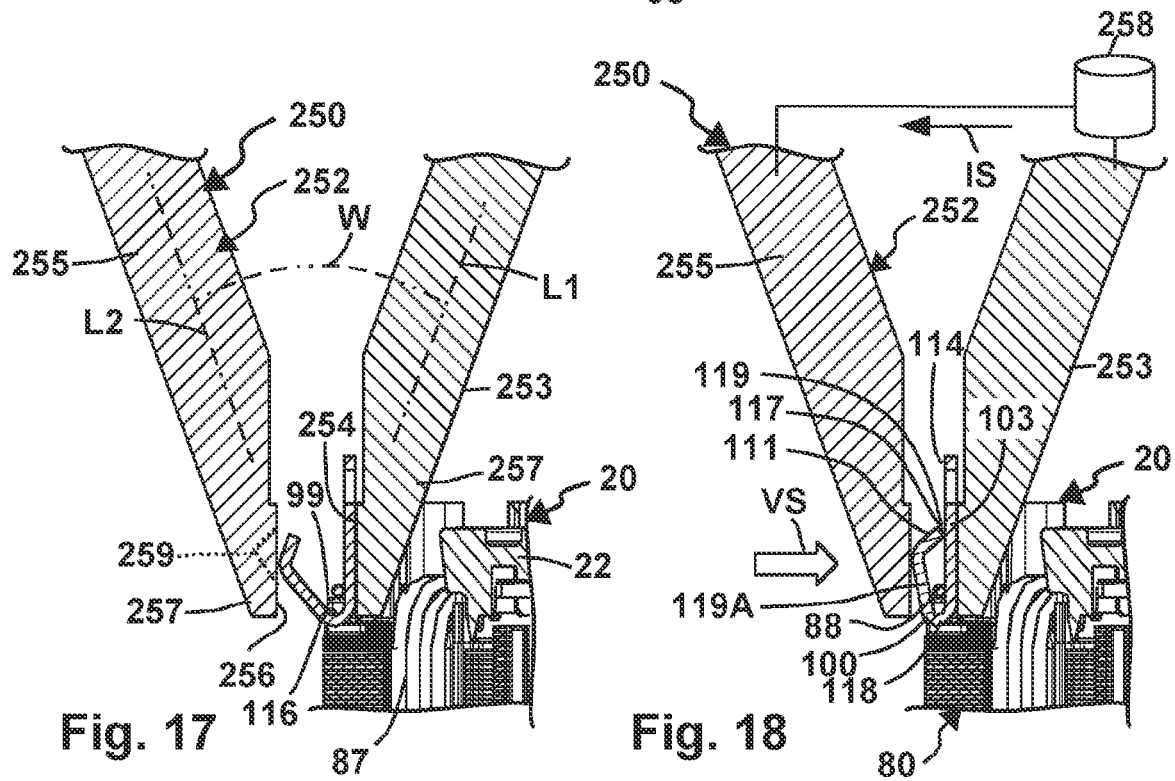

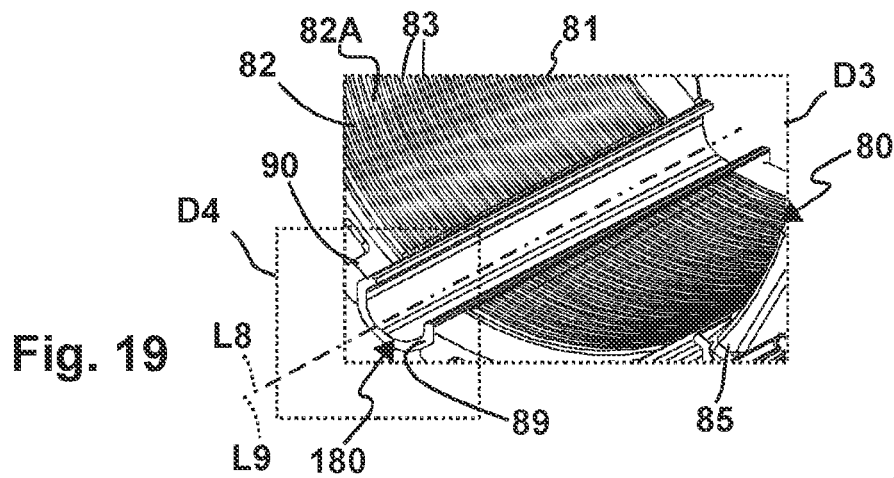
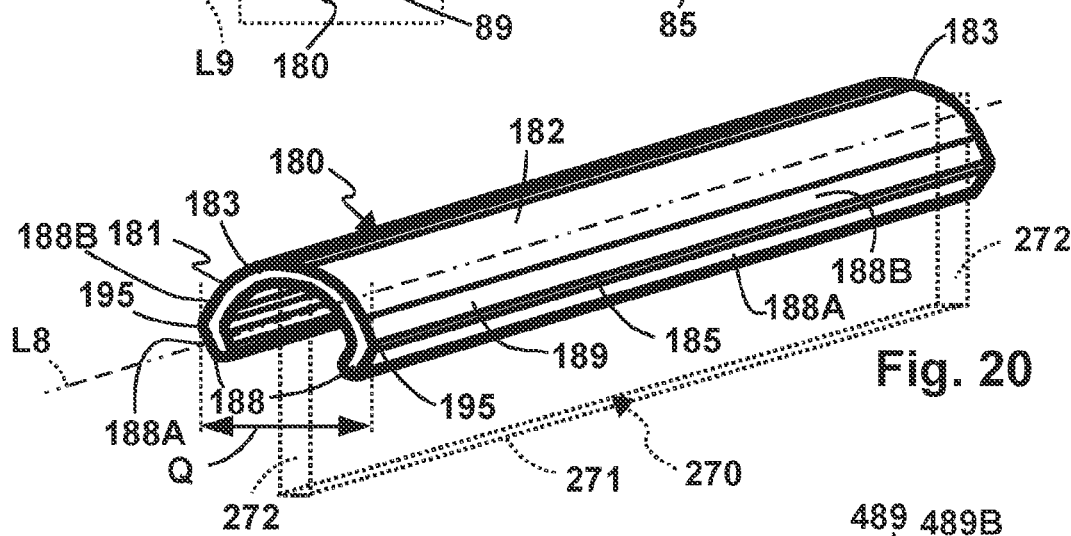
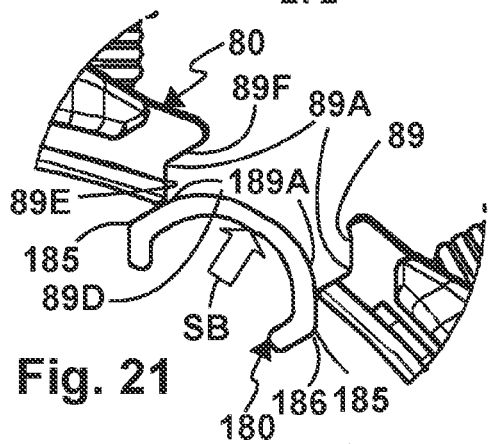
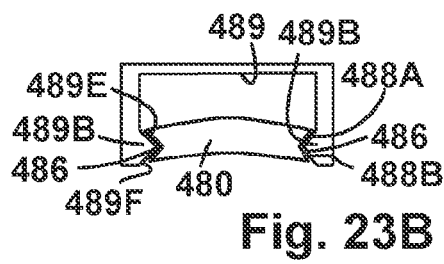
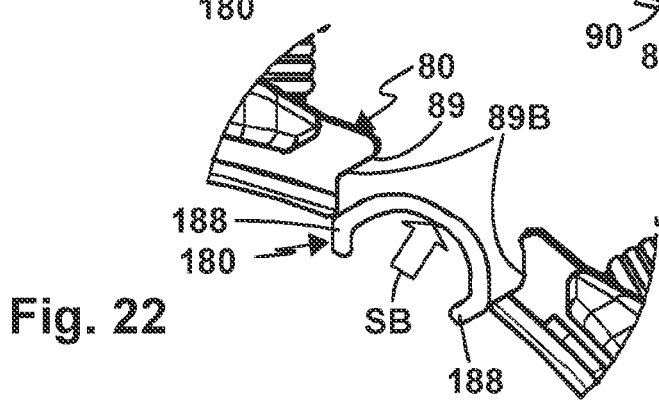
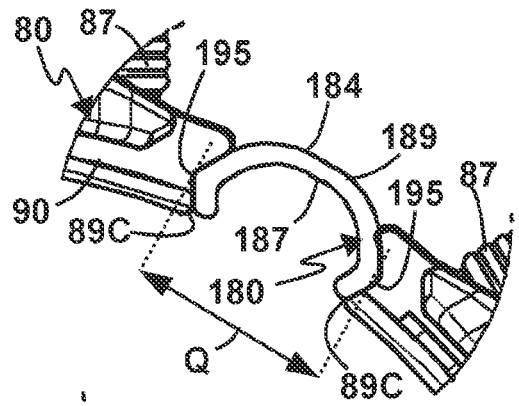

DRIVE MOTOR WITH A CONNECTION DEVICE

This application is a National Stage application based on International Application No. PCT/EP2020/062056, filed Apr. 30, 2020, which claims priority to DE 102019111335.0, filed May 2, 2019.

BACKGROUND OF THE INVENITON

The invention relates to a drive motor for a suction device or a machine tool in the form of a handheld power tool or a semi-stationary machine tool, wherein the drive motor includes a stator having an excitation coil assembly and a rotor having a motor shaft, which is rotatably mounted around a rotational axis on the stator or with respect to the stator by means of a bearing assembly, wherein the drive motor includes a connecting unit for electrically connecting the drive motor to an energizing unit for energizing the excitation coil assembly, wherein the connecting unit includes a base body for fastening on the stator and a receptacle arm protruding from the base body, between which a conductor receptacle for at least one electrical coil conductor of an excitation coil of the excitation coil assembly is formed, and wherein the connecting unit includes a connecting contact region for electrically connecting a connecting line for connection to the energizing unit. The invention furthermore relates to a method for installing such an electrical connecting unit of such a drive motor.

Such a connecting unit can also be referred to as a terminal. The electrical connecting line is, for example, plugged or soldered onto the terminal to electrically connect an excitation coil to the energizing unit in this way.

A receptacle arm typically protrudes obliquely at an angle from a plate-shaped base body, which is used for the connection to the connecting line, so that the conductor receptacle is laterally open to insert the coil conductor or the coil conductors into the conductor receptacle. A curved bottom region is provided between the receptacle arm and the base body, on which the coil conductor rests. The receptacle arm is subsequently moved toward the base body, for example bent. Finally, a welding current is introduced into the connecting unit via welding electrodes, which in particular flows through the bottom region and ensures significant heating there, so that, for example, a protective lacquer of the coil conductor melts and an electrical connection is established between the coil conductor and the connecting unit.

However, the great heat in the region of the bottom of the conductor receptacle has the result in some cases that the coil conductor is changed there to such an extent that it breaks in operation of the drive motor.

SUMMARY OF THE INVENTION

It is therefore the object of the present invention to provide an improved connecting unit.

To achieve the object, it is provided in the drive motor of the type mentioned at the outset that the receptacle arm and the base body are connected to one another by means of two electrically conductive connection regions and form a receptacle eye enclosing the conductor receptacle in a ring shape, so that the conductor receptacle has a closed state and a welding current between the base body and the receptacle arm can flow past the conductor receptacle via the electrical connection regions.

The receptacle eye is closed in a ring shape around the conductor receptacle, so that the welding current flows or can flow around the conductor receptacle.

The receptacle arm and the base body form a receptacle eye enclosing the conductor receptacle in a ring shape to receive the at least one coil conductor, which receptacle eye includes two electrically conductive connection regions between the base body and the receptacle arm, between which the conductor receptacle is arranged.

It is a basic concept here that the current not only flows via an electrical connection section, for example the transition region or connection section between base body and receptacle arm, but rather via a second connection region, so that the welding current quasi-flows through the conductor receptacle between the connection regions. Furthermore, the two electrical connection sections ensure that the welding current does not partially heat the connecting unit to a great extent, but rather that two connection sections are used so that the heat distribution is more favorable. The coil conductor thus becomes less hot and less negatively affected, for example.

A connecting unit for electrically connecting a drive motor for a suction device or a machine tool in the form of a handheld power tool or a semi-stationary machine tool to a power supply unit is also capable of achieving the object, wherein the drive motor includes a stator having an excitation coil assembly and a rotor having a motor shaft, which is rotatably mounted around a rotational axis on the stator or with respect to the stator by means of a bearing assembly, wherein the connecting unit includes a base body for fastening on the stator and a conductor receptacle for at least one electrical coil conductor of an excitation coil of the excitation coil assembly, wherein the conductor receptacle is formed between the base body and a receptacle arm, and wherein the connecting unit includes a connecting contact region for electrically connecting a connecting line for the power supply of the drive motor. It is provided that the receptacle arm and the base body are connected to one another by means of two electrically conductive connection regions and form a receptacle eye enclosing the conductor receptacle in a ring shape, so that the conductor receptacle has a closed state and a welding current between the base body and the receptacle arm can flow past the conductor receptacle via the electrical connection regions.

A method of the type mentioned at the outset provides the following to achieve the object:

inserting the at least one coil conductor into the conductor receptacle connecting the receptacle arm and the base body while forming two electrically conductive connection regions, so that the receptacle arm and the base body form a receptacle eye enclosing the conductor receptacle in a ring shape and the conductor receptacle has a closed state, and applying welding electrodes to the base body and the connecting arm and energizing using a welding current, which flows via the electrical connection regions past the conductor receptacle between the base body and the receptacle arm.

In particular, it is advantageous if the method includes adjusting, in particular bending, the receptacle arm, in particular by means of at least one welding electrode, from a position spaced apart from the base body, in which the conductor receptacle has an open state and is open for insertion of the coil conductor on one side, into a position adjusted toward the base body, in which the conductor receptacle has the closed state. The receptacle arm is thus first adjusted away from the base body, so that the at least one coil conductor is easily insertable into the conductor receptacle. The receptacle arm is then moved toward the base body, the conductor receptacle is thus closed. A bending unit separate from the welding electrode can be used for this adjusting or bending, for example a pressure ram or the like. However, it is advantageous if the welding electrodes simultaneously provide the positioning unit or bending unit.

It is to be noted here that advantageously at least one of the electrodes includes a point or tapers off narrowly at its free end, so that it is insertable into an intermediate space between the stator supporting the connecting unit, in particular a carrier body of the stator, and the connecting unit. This welding electrode is preferably a welding electrode which supports the connecting unit, in particular its base body, in a stationary manner. A welding electrode opposite to this welding electrode is used for adjusting the receptacle arm toward the base body.

The material of the connecting unit in the region of the receptacle eye, thus, for example, the base body and the receptacle arm protruding from the base body, is preferably a metal material, in particular a soft metal material, for example copper, aluminum, or the like. A hardness of the material of the connecting unit in the region of the receptacle eye corresponds, for example, to a Mohs hardness of 2.5 to 3 or a Vickers hardness (VHN) of 77-99 at a testing force of 100 g.

It can be provided that the receptacle arm is more or less mechanically prepared or designed for the electrical contact or to produce the electrical connection region with the main body, for example in that a closing leg protrudes from an arm section of the receptacle arm in the direction of the base body. However, it is also possible that, for example, the welding electrode(s) or a pressure ram processes the receptacle arm, in particular deforms it. A partial deformation of an end region of the receptacle arm is advantageously provided, in particular by means of at least one welding electrode, in the direction of the base body in such a way that a free end of the receptacle arm, in particular an end side or narrow side of the receptacle arm, is in touch contact with the base body to form one of the electrical connection regions before and during the energizing using the welding current. For example, the welding electrode or the pressure ram can form the closing leg by deformation of the receptacle arm.

The receptacle arm is advantageously adjustable from a position spaced apart from the base body, in which the receptacle arm has an open state and is open on one side for inserting the at least one coil conductor, into a position adjusted toward the base body, in which the receptacle arm has the closed state. For example, the receptacle arm forms a hook projection, which protrudes in front of the base body in the open state of the conductor receptacle. The conductor receptacle thus includes an insertion opening in the open state. For example, the receptacle arm protrudes in a V-shape from the base body in the open position of the conductor receptacle.

It is advantageously provided that a free end of the receptacle arm, in particular an end side or narrow side of the receptacle arm, is in touch contact with the base body to form one of the electrical connection regions before and during the energizing using the welding current. The touch contact is maintained, for example, in that the welding electrodes which press against the receptacle arm and base body keep the free end of the receptacle arm in touch contact an electrical contact with the base body. In particular in the touch contact region, such a heat arises upon application of welding current to the connecting unit that the initially still free end of the receptacle arm fuses or welds with the base body.

It is advantageously possible that the receptacle arm is welded at one or both electrical connection regions to the base body, in particular by means of an electrical weld. However, it is advantageous if the receptacle arm is only welded to the base body at one of the electrical connection regions, namely at its initially still free end region. However, the receptacle arm can also be a component which is initially separate from the base body and is welded to the base body at the connection regions. For example, the receptacle arm can be designed in the manner of a hasp.

As explained, it is possible that the receptacle arm and the base body are two separate components from one another. However, it is advantageous if the receptacle arm is fixedly connected to or integral with the base body by means of a connection portion.

The connection portion can form one of the electrical connection regions, for example. The welding current can flow from the base body to the receptacle arm via the connection portion.

The connection portion in particular has an arched or curved profile.

For example, the connection region forms a receptacle groove or a bottom of the conductor receptacle.

It is possible that the connection portion is V-shaped or U-shaped.

The receptacle arm can have, for example, an elongated formation. However, the receptacle arm can also have an arched, U-shaped, or V-shaped profile.

It is advantageous if the receptacle arm includes an arm portion which is opposite to a front side of the base body in the region of the conductor receptacle in the closed state of the conductor receptacle at a distance suitable to receive the at least one coil conductor, in particular a parallel distance. The arm portion is connected, for example, via the connection portion to the base body. The arm portion and the base body in the region of the conductor receptacle preferably have a longitudinal formation. For example, a series arrangement or a stack of coil conductors, thus at least two coil conductors, can be received in the parallel distance between base body and arm section.

It is advantageously provided that the arm portion in the open state of the conductor receptacle protrudes at a larger angle from the front side of the base body than in the closed state of the conductor receptacle. For example, the arm portion protrudes in the open state obliquely at an angle from the base body and extends in the closed state in parallel to the front side of the base body.

It is advantageous if the receptacle arm includes a closing leg protruding from the arm portion in the direction of the front side of the base body. The closing leg protrudes at an angle from the arm portion. The closing leg can protrude at a right angle from the arm portion, for example. However, an oblique inclination of the closing leg from the arm portion in a direction away from the conductor receptacle is preferably provided.

A length of the closing leg and its angular positions with respect to the arm portion are preferably designed so that the arm portion, on its longitudinal end regions, at which the closing leg and the connection portion are provided, has the same distance or approximately the same distance to the front side of the base body in the closed state of the conductor receptacle.

It is advantageous in any case if the arm portion extends essentially in parallel to the front side of the base body in the closed state of the conductor receptacle.

It is furthermore preferably provided that the conductor receptacle includes a longitudinal formation in the region of the arm portion to receive multiple coil conductors in a series arrangement in parallel to the longitudinal extension of the arm portion.

A plug installation is advantageous. In particular, it is provided that the base body includes at least one insertion projection to be plugged into a socket of the stator.

The insertion projection can extend in parallel to the longitudinal extension of the conductor receptacle, for example. It is possible, for example, that the connecting contact region and the insertion projection are provided on opposing longitudinal end regions of the base body.

However, it is preferred if the at least one insertion projection protrudes laterally from the base body and/or the receptacle arm. For example, the insertion projection forms a lateral leg protruding laterally from the base body. In contrast, the receptacle arm preferably forms a front leg protruding frontally from the base body.

It is preferably provided that an insertion projection protrudes in each case from the base body on opposing sides. The insertion projections and the connecting contact region can form a T-shaped configuration, for example.

It is advantageous if the at least one insertion projection, on its free end region protruding from the base body, includes at least one formfitting contour for formfitting engagement in the socket of the stator, in particular a toothing. However, the formfitting contour can also include, for example, a barb, rounded sections, or the like. When welding current flows through the connecting unit, it heats up, so that the material of the stator in the region of the socket, preferably a plastic material, becomes soft and fuses with the at least one formfitting contour. Of course, it is also possible that the at least one formfitting contour includes one or more sharp edges which cut into the socket of the stator and ensure a hold of the connecting unit there.

It is expediently provided that the at least one insertion projection is arranged on a portion of the base body delimiting the conductor receptacle. In this configuration, the insertion projection ensures a hold of the connecting unit in the region of the conductor receptacle. For example, the above-mentioned T-shaped formation thus results.

It is furthermore advantageous if a free end region of the at least one insertion projection and the base body lie in planes parallel to one another and spaced apart from one another. The insertion projection and the base body are connected to one another by means of a step, for example.

In particular, it is advantageous if a step is present between the at least one insertion projection and the base body.

It is preferably provided that, on at least one of the electrical connection regions between the base body and the receptacle arm, a support contour is arranged to support the at least one coil conductor at a distance to an inner surface, in particular a bottom, of the conductor receptacle on the connection region, so the at least one coil conductor is not in touch contact with the connection region during energizing using the welding current. The at least one support contour, preferably multiple support contours, ensure that heat generated by the welding current does not act or acts to a lesser extent from the connection region on the at least one coil conductor.

In principle, it is possible that the at least one support contour forms a component of the connecting unit. For example, a support contour can be arranged on the base body, for example a depression, which supports the coil conductor at a distance to the connection region between base body and receptacle arm. If the connecting unit provides the support contour, it is advantageous if a thermal insulation is present between the support contour and the connection region. For example, a carrier body made of plastic or the like can be arranged on the base body, which provides the support contour of the connecting unit.

It is advantageously provided that the support contour is arranged on a component separate from the connecting unit, in particular the stator or an installation unit. In particular, it is advantageous if a carrier body of the stator, for example a plastic carrier body of the stator, which carries and/or encloses a laminated core of the stator, provides the support contour. It is also possible that the support contour does not form a component of the drive motor, but rather is arranged on the installation unit. The installation unit can include, for example, support projections, which support the at least one coil conductor during the welding process and hold it at a distance to the electrical connection region adjacent to the conductor receptacle. When the welding process is completed, the support is no longer necessary. The coil conductor can then, for example, already be partially fused with the material of the connecting unit, so that it is held fixed in place with respect to the conductor receptacle.

An arrangement of the connecting unit between two support contours is advantageous.

It is advantageously provided that an electrical connection region between the base body and the receptacle arm is arranged between two support contours of the stator, in particular two support contours on an electrically insulating carrier body of the stator, wherein the support contours support the at least one coil conductor at a distance to the in particular trough-shaped connection region. For example, support shoulders can be provided on the carrier body of the stator, on which the at least one coil conductor rests.

Further measures can be provided for mechanically protecting the coil conductor. For example, it is advantageous if the connecting unit includes an elongated support surface and a lateral narrow side angled thereto in the region of the conductor receptacle, wherein an oblique surface obliquely inclined to the support surface and to the narrow side for supporting the at least one coil conductor is arranged between the support surface and the narrow side. The support surface is provided, for example, on a bottom of the bearing receptacle. However, the term support surface is not to be understood to mean that the coil conductor rests or has to rest on the support surface, but rather that it is held, for example, by the above-mentioned support contour or the support contours at a distance to this support surface.

The connecting contact region of the connecting unit contains, for example, an insertion projection or a socket for plugging on the connecting conductor, which is provided for the connection to the energizing unit. Furthermore, the connecting contact region advantageously includes a solder surface and/or a hole for soldering on a connecting conductor.

A magnet assembly arranged on the rotor comprises magnets, in particular permanent magnets.

For example, magnet bodies of the magnets which are magnetized or suitable for magnetization on the laminated core of the rotor consist of aluminum-nickel-cobalt, Bismanol, thus an alloy made up of bismuth, manganese, and iron, of a ferrite, for example a hard-magnetic ferrite, for example based on barium, strontium, of neodymium-iron-boron (NdFeB), advantageously with an additive of dysprosium, of samarium-cobalt (SmCo), advantageously having 20-25% iron component, e.g., $SmCo_5$, $Sm_2Co_{17}$, $Sm(Co,Cu,Fe,Zr)_z$, or the like. Rare-earth magnets or plastic magnets are also suitable. Furthermore, AlNiCo alloys, PtCo alloys, CuNiFe and CuNiCo alloys, FeCoCr alloys, martensitic steels, or MnAlC alloys are suitable for the magnet bodies.

The drive motor is preferably a brushless motor or electronically commutated motor. In particular, it is advantageous if the respective stator of the drive motor includes permanent magnets or is excited by permanent magnets.

Laminated cores of the rotor and/or the stator are preferably produced from layered electrical sheets or transformer sheets.

A stator of the drive motor expediently comprises a carrier body made of plastic, in particular made of polyamide. The carrier body is produced, for example, by potting and/or extrusion coating the laminated core of the stator. It is also possible that the carrier body comprises one or more plug bodies or plug carrier bodies, which are plugged onto the laminated core. For example, such a plug carrier body can be plugged onto one or both end sides of the laminated core. The carrier body preferably covers the laminated core in the region of the rotor receptacle and/or in the region of one or both end sides of the laminated core. Supports, support projections, winding heads, and the like for accommodating coil conductors of the excitation coil assembly are preferably provided on the carrier body. Furthermore, the carrier body preferably includes electrical connecting contacts or connecting units for connecting a connecting line, using which the drive motor is connectable or connected to an energizing unit.

BRIEF DESCRIPTION OF THE DRAWINGS

Exemplary embodiments of the invention are explained hereinafter on the basis of the drawings. In the figures:

FIG. 5 shows an insulation sleeve of the drive motor according to FIG. 4 in a perspective illustration, FIG. 6 shows a perspective illustration of a rotor of the drive motor according to FIG. 4, FIG. 7 shows a sectional illustration through the rotor according to FIG. 6 during its production, approximately along a section line B-B in FIG. 6, FIG. 8 shows the view approximately corresponding to FIG. 7, wherein the motor shaft is inserted completely into the rotor laminated core, however, FIG. 9 shows a detail D1 from FIG. 8, FIG. 16 shows a perspective diagonal illustration to illustrate an installation and processing of the connecting unit according to FIGS. 10 to 14 in a perspective diagonal illustration, approximately corresponding to FIG. 10 with a welding gun, FIG. 17 shows a section through the arrangement according to FIG. 16 approximately along a section line D-D, FIG. 18 shows the image according to FIG. 17, but with welding gun arms moved toward one another, FIG. 19 shows a detail D3 of the stator according to FIG. 1 with a groove cover, which in FIG. 20 is shown diagonally in perspective, FIG. 21 shows a detail D4 from FIG. 19 during an installation of the groove cover according to FIG. 17 in a stator groove, FIG. 22 shows detail D4, but with groove cover adjusted further in the stator groove, and FIG. 23 shows detail D4 with fully installed groove cover, FIG. 23B shows alternative embodiments of a groove cover and a groove, approximately corresponding to the view according to FIG. 23.

DETAILED DESCRIPTION

Figure 1:
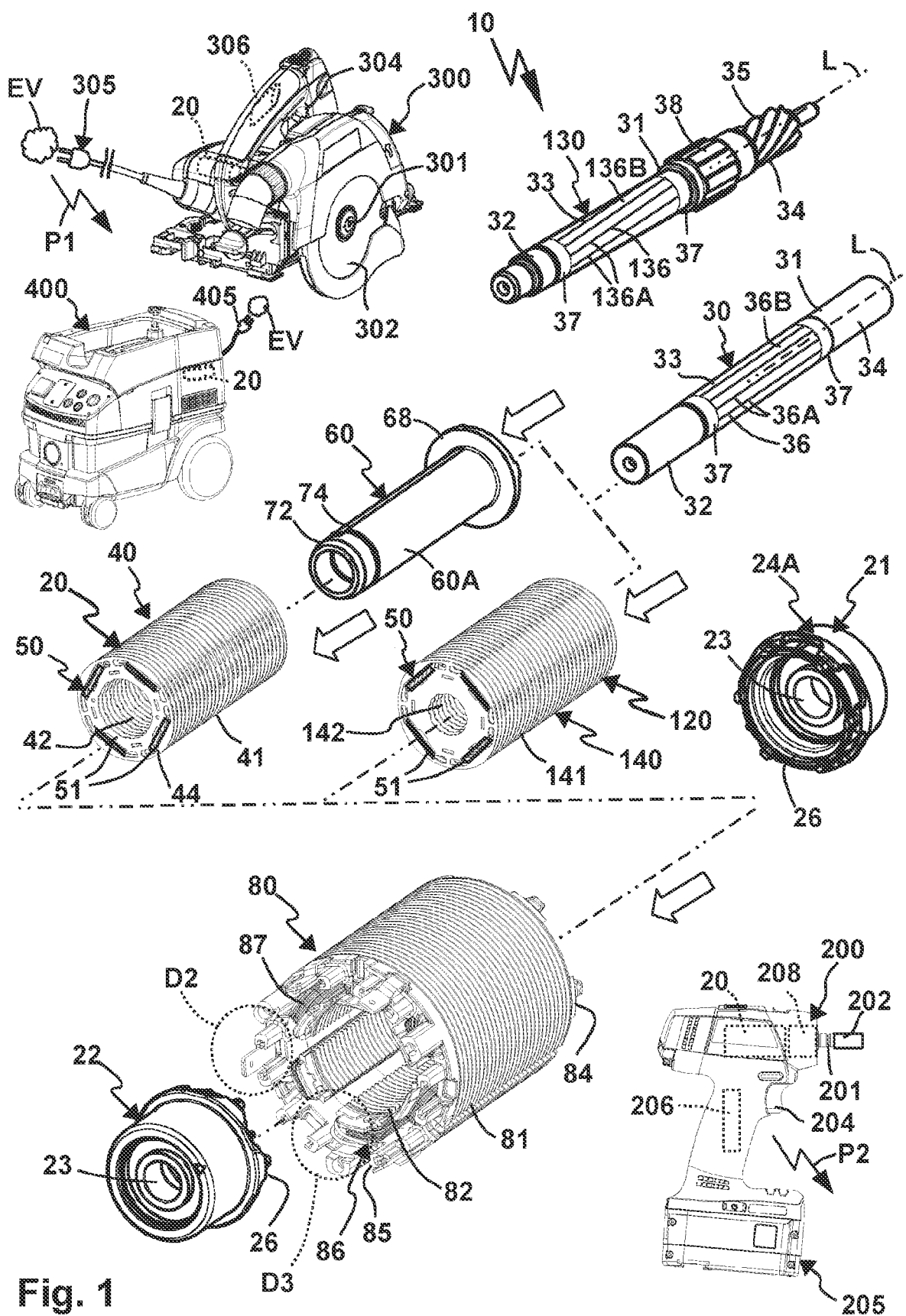
FIG. 1 shows a perspective diagonal illustration of a system of two electric drive motors and hand-held power tools which include these drive motors.
Figure 2:
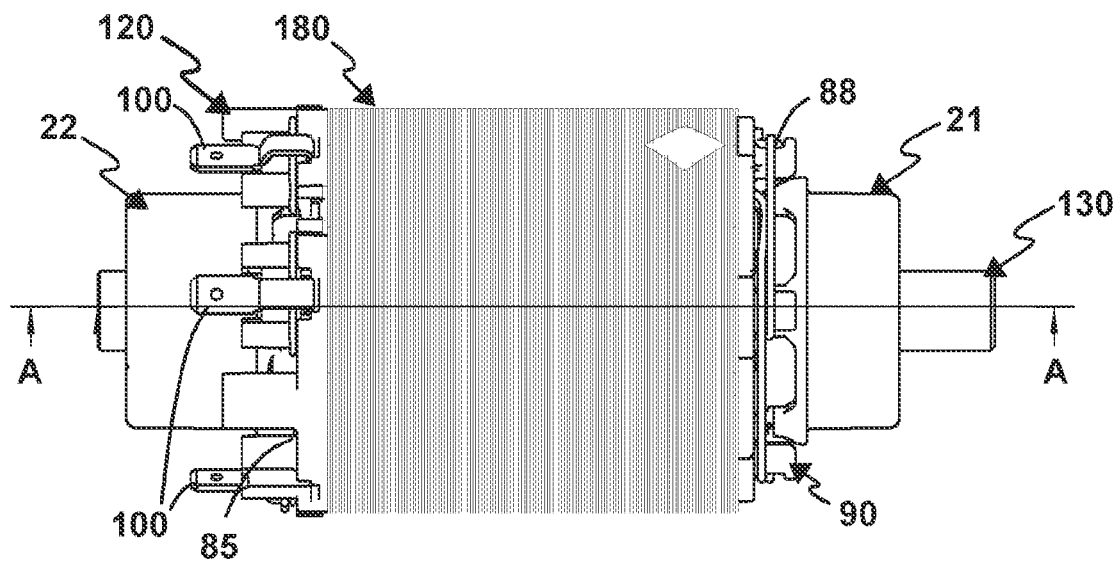
FIG. 2 shows a side view of the one drive motor of the system according to FIG. 1, of which in FIG. 3 a section is shown along a section line A-A FIG. 2.
Figure 3:
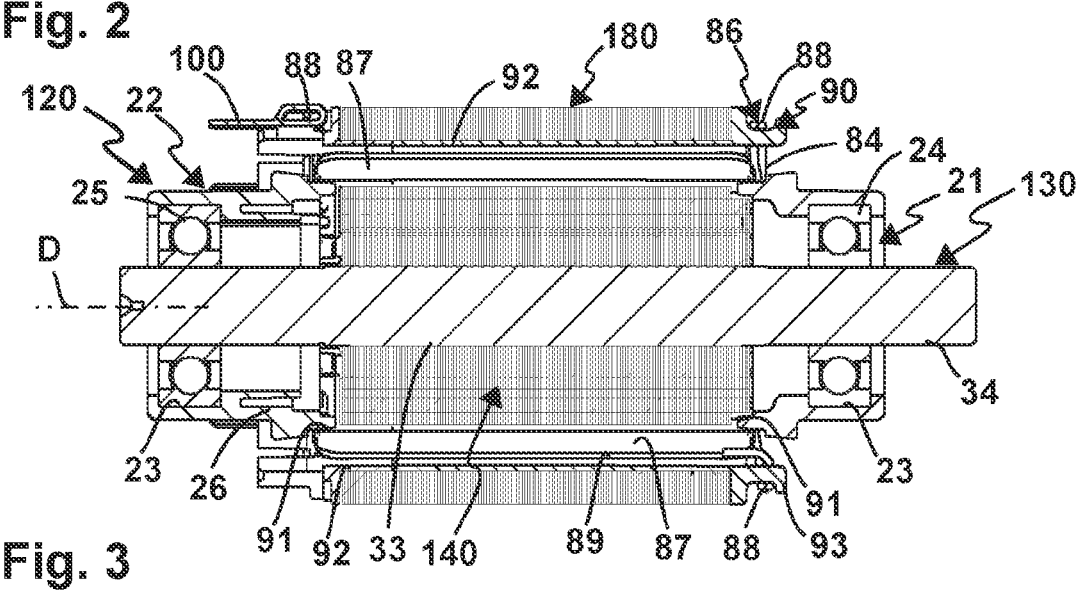
Figure 4:
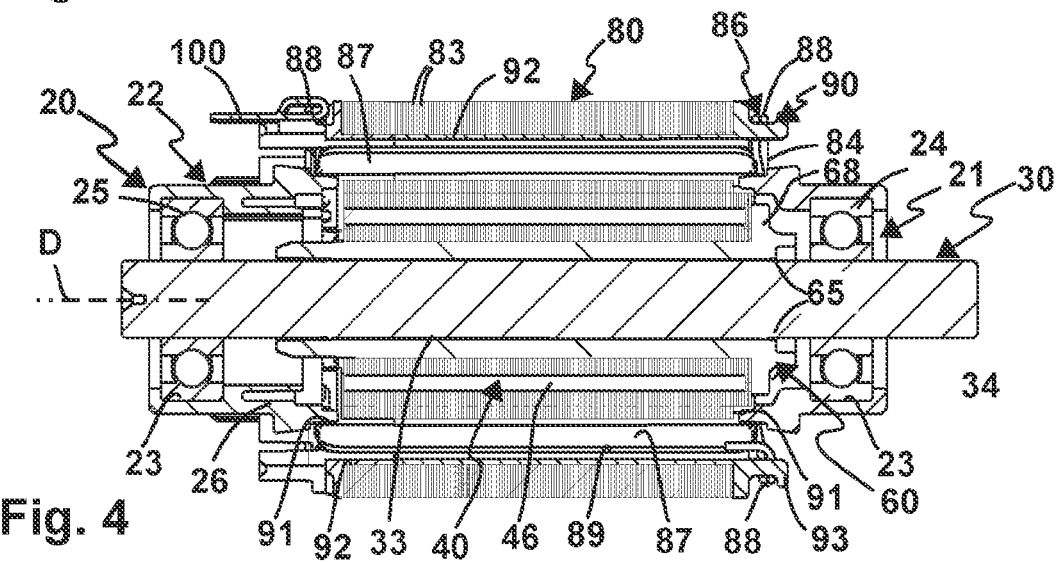
FIG. 4 shows a section through the other drive motor of the system according to FIG. 1, approximately along the same section line A-A corresponding to FIG. 2.

FIG. 1 shows a system illustration comprising a hand-held power tool 300, for example a saw, in which a drive motor 20 drives a tool receptacle 301 for a working tool, for example directly or via a gearing (not visible in the drawing). A working tool 302, for example a cutting tool, sawing tool, or the like is arrangeable or arranged on the tool receptacle 301. The drive motor 20 is accommodated in a housing 303 of the power tool 300 and can be switched on and switched off by means of a switch 304. A speed of the drive motor 20 is preferably also adjustable using the switch 304.

A connecting cable 305 for connection to a power supply grid EV is used for the electrical power supply of the hand-held power tool 300. The power supply grid EV provides a supply voltage P1, for example 110 V AC voltage, 230 V AC voltage, or the like. The hand-held power tool 300 can include an energizing unit 306 connected between the switch 304 and the drive motor 20.

The drive motor 20 can also be provided to operate a suction device 400, in particular to drive a suction turbine of the suction device 400. The suction device 400 includes the drive motor 20 and is connectable, for example, by means of a connecting cable 405 to the power supply grid EV.

The voltage P1 is in any case significantly greater, for example at least four times to five times greater, than a voltage P2, which an energy accumulator 205 of a hand-held power tool 200 provides. The voltage P2 is, for example, a DC voltage of 14 V, 18 V, or the like.

The hand-held power tool 200 is, for example, a power screwdriver, drill, or the like. A drive motor 120, which is suitable for the lower voltage P2, is accommodated in a housing 203 of the hand-held power tool 200. The drive motor 120 is energized by an energizing unit 206, which is supplied with electrical energy by the energy accumulator 205. The drive motor 120 drives a tool receptacle 201 for a working tool 202, for example a drilling tool or screwing tool, directly or via a gearing 208. The energizing unit 206 can be switched on, switched off, and/or designed for adjusting a speed of the drive motor 120 by way of a switch 204.

The drive motors 20, 120 include partially identical or similar components.

For example, motor shafts 30 and 130 alternately usable in the drive motors 20, 120 each include bearing portions 31, 32, between which a holding portion 33 is provided. The bearing portion 32 is located adjacent to an output portion 34, which is used to drive the tool receptacle 201 or 301. For example, a gearwheel can be arranged or arrangeable on the output portion 34. Alternatively, gear teeth 35 are provided as indicated in the case of a motor shaft 130. The holding portion 33 preferably includes a formfitting contour 36, which extends between planar portions 37, which thus do not include a formfitting contour.

The formfitting contour 36 comprises, for example, grooves and/or projections 36A extending in parallel to a longitudinal axis L of the motor shaft 30. However, a fluting, a honeycomb-like structure, or the like can also be provided as the formfitting contour 36.

A formfitting contour 136 of the motor shaft 130 comprises, for example, formfitting projections 136A inclined obliquely to the longitudinal axis L. The formfitting projections 136A have a slight oblique inclination, however, for example between 5 and 15°, so that the formfitting projections 136A extend essentially in parallel to the longitudinal axis L.

The formfitting contours 36, 136 form, for example, formfitting contours 36B, 136B.

The output portion 34 can be provided to drive a fan wheel. For example, a fan wheel holder 38 is provided on the motor shaft 130, which is arranged, for example, between the gear teeth 35 and the bearing portion 32.

The motor shaft 30 or 130 is connectable in a rotationally-fixed manner to a laminated core 41 or 141 of a rotor 40, 140. The laminated cores 41, 141 include sheets 43 arranged adjacent to one another in a series arrangement transverse to the longitudinal axis L, for example electrical sheets or transformer sheets, in a way known per se.

The laminated cores 41, 141 include shaft through-openings 42, 142, which have different diameters. The shaft through-opening 42 has a larger diameter than the shaft through-opening 142. The motor shaft 30 or 130 can be inserted by means of an insulation sleeve 60 into the shaft through-opening 42, while the motor shafts 30 or 130 can be inserted directly into the shaft through-opening 142, i.e., an insulation sleeve or similar other body is not necessary.

The insulation sleeve 60 forms an insulation body 60A, by means of which the laminated core 41 is electrically insulated from the respective motor shaft 30 or 130 carrying it.

Magnet assemblies 50 are arranged on the laminated cores 41 and 141. The laminated cores 41 or 141 include holding receptacles 45 for magnets 50 of the magnet assemblies 50. For example, four holding receptacles 45 and associated magnets 51 are provided, so that the rotor 40, 140 forms a total of four magnetic poles. The magnets 51 are, for example, permanent magnets.

The magnets 51 have, for example, a plate-shaped design. The magnets 51, for example, magnet plates or plate bodies 56. The holding receptacles 45 are accordingly suitable for accommodating plate-shaped, thus flat rectangular, cubic plate bodies or magnet plates and include corresponding inner circumferential contours.

The holding receptacles 45 and the magnets 51 extend in parallel to the longitudinal axis L of the motor shaft 30, 130 or in parallel to the rotational axis D of the motor 20, 120.

Furthermore, the rotor 40, in particular as the laminated core 41, 141, is penetrated by air ducts 46, which extend in parallel to the longitudinal axis L of the motor shaft 30, 130 and are open at the end sides 44 of the rotor 40, 140, so that air can flow through the laminated cores 41, 141.

The shaft through-opening 42, 142 does have an essentially circular inner circumferential contour, but advantageously additionally also has a twist-lock contour 47, in particular a twist-lock receptacle 47A. The twist-lock contour 47 is, for example, a longitudinal groove 47B, which extends in parallel to the rotational axis D or longitudinal axis L.

Both motor shafts 30, 130 can each be inserted into the laminated cores 41, 141.

In the laminated core 141, the shaft through-opening 142 of which has a smaller diameter than the shaft through-opening 42 of the other laminated core 41, the respective motor shaft 30, 130 can be inserted directly into the shaft through-opening 142, for example pressed in.

The narrow sides or end sides of the sheets 43, which delimit the inner circumference of the shaft through-opening 42 or protrude into it, advantageously claw together with the motor shaft 30, 130, so that it is accommodated non-displaceably in the laminated core 141 in a first direction parallel to the rotational axis D or to its longitudinal axis L. An electrical conductivity of the laminated core 141 and the motor shaft 30, 130, which preferably consists of metal, is possible in spite of the direct contact between the laminated core 141 and the motor shaft 30, 130, because the rotor 140 is provided for use with the drive motor 120 and thus for the lower voltage P2.

In contrast, insulation measures are taken in the rotor 40, so that in spite of the electrical conductivity of the motor shaft 30, 130 and of the associated laminated core 41, electrical safety is provided.

Specifically, the motor shaft 30, 130 is accommodated by means of an insulation sleeve 60 in the laminated core 41. The insulation sleeve 60 thus more or less forms a protective jacket or an outer envelope of the motor shaft 30, 130 in the section which is accommodated in the shaft through-opening 42.

The insulation sleeve 60 includes a tube portion 63 between its longitudinal ends 61, 62, which is arranged in a sandwiched manner between the laminated core 41 and the motor shaft 30, 130 and electrically insulates it from the laminated core 41.

The tube portion 63 includes a socket 64 for inserting through the motor shaft 30, 130, which extends from the longitudinal end 61 to the longitudinal end 62. In the region of the longitudinal end 61, the socket 64 has an insertion opening 64A, through which the motor shaft 30 is insertable into the socket 64. The motor shaft 30 exits from the socket 64 at an exit opening 64B.

In the region of the longitudinal end 61, i.e., a longitudinal end region 61A, the socket 64 has a larger diameter W1 and thus a larger inner cross section WQ1 than in the region of the longitudinal end 62, i.e., a longitudinal end region 62A, where a smaller diameter W2 and thus a smaller inner cross section WQ2 is provided. For example, the diameter of the motor shaft 30, 130 is approximately 10 mm in the region of the longitudinal ends 61, 62. In contrast, the diameter W2 is smaller by approximately 0.2 mm to 0.3 mm than the diameter W1 before the motor shaft 30, 130 is inserted into the socket 64. Thus, when the motor shaft 30, 130 is inserted along an insertion axis S into the insulation sleeve 60 from the longitudinal end 61 to the longitudinal end 62, as indicated in FIG. 7, it first penetrates slightly or with transverse play with respect to the insertion axis S into the insertion opening 64A at the longitudinal end 61, where the socket 64 has the diameter W1. The diameter W1 is advantageously somewhat larger than the diameter of the motor shaft 30, 130 at its free longitudinal end provided to be inserted into the socket 64. The region of the insertion opening 64A forms a centering section, in which the motor shaft 30, 130 is centered with respect to the insulation sleeve 60 or the rotational axis D. For example, the motor shaft 30 has the same outer cross section or outer diameter both in the region of the diameter W1 and also in the region of the diameter W2.

Alternatively or additionally, it is possible that, for example, the motor shaft 30 includes a first outer cross section AQ1 and a second outer cross section AQ2, which are associated with the longitudinal ends 61, 62 of the socket 64, wherein the first outer cross section AQ1 is smaller than the second outer cross section AQ2. In this design of the motor shaft 30, it is also possible that the diameters W1 and W2 and thus the inner cross sections of the socket 64 are identical or approximately equal in the region of the longitudinal ends 61 and 62.

The socket 64 becomes narrower from the diameter W1 to the diameter W2, preferably continuously, between the longitudinal ends 61, 62. However, it would also be possible that at least one step is provided between the diameter W1 and the diameter W2. The socket 64 advantageously includes a plug cone, which becomes narrower from the longitudinal end 61 to the longitudinal end 62.

Insertion bevels 65, for example an insertion cone, are advantageously provided at the longitudinal end 61 in order to facilitate the insertion process of the motor shaft 30, 130 into the socket 64.

When the motor shaft 30, 130 is inserted along the insertion axis S into the socket 64, it penetrates further and further in the direction of the longitudinal end 62, wherein it more or less widens the tube portion 63, which becomes narrower toward the longitudinal end 62.

The installation is structured as follows:

First the insulation sleeve 60 is inserted into the shaft through-opening 42 of the laminated core 41.

It is advantageously provided that the insertion cross section or inner cross section of the shaft through-opening 42 is equal or approximately equal over its entire length provided for the insertion of the insulation sleeve 60.

However, it is also possible that the shaft through-opening 42 has a larger inner cross section at a longitudinal end region 41A provided for inserting the insulation sleeve 60 than at a longitudinal end region 41B opposite to this longitudinal end region.

The motor shaft 30, 130 is then inserted into the socket 64. Therefore, when is inserted along the insertion axis S into the socket 64, the motor shaft 30, 130 presses the radial outer circumference of the tube portion 64 in the direction of the radial inner circumference of the shaft through-opening 42. The sheets 43 preferably engage with their narrow sides facing toward the shaft through-opening 42 like teeth into the circumferential wall 66.

The socket 64 has the narrower diameter W2 up into a region in front of the laminated core 41, so that the motor shaft 30, 130, when it reaches this region of the socket 64, then widens the circumferential wall 66 of the tube portion 63 radially outward with respect to the insertion axis S and thus more or less stretches the tube or the tube portion 63. A formfitting section 75 having a step 67 thus forms on the outer circumference of the circumferential wall 63, which directly engages in or engages behind the end side 44 of the laminated core 41. The step 63 thus holds the insulation sleeve 60 with a force direction opposite to the insertion direction, in which the motor shaft 30, 130 is insertable into the socket 64, on the laminated core 41.

At the other longitudinal end region, the longitudinal end 61, the insulation sleeve 63 includes a flange body 68, which protrudes radially outward from the tube portion 63 with respect to the insertion axis S or the longitudinal axis L.

The flange body 68 forms a longitudinal stop 68A with respect to the insertion axis S and is supported, for example, on the end side 44 of the laminated core 41 in the region of the longitudinal end 61. The flange body 68 includes, for example, reinforcing ribs 69, which extend from its radial circumference in the direction of the socket 64, i.e., radially inward toward the insertion axis S. The reinforcing ribs 69 are arranged, for example, on an end side 71 of the flange body 68 facing away from the laminated core 41.

Furthermore, a support stop 70 for the motor shaft 30, 130 is provided on the insertion opening 64A, on which a support stop 39, for example a step, of the motor shaft 30, 130 can strike with a force direction parallel to the insertion axis S. The support stop 70 is formed, for example, by a step between the end side 71 of the insulation sleeve 60 and the socket.

The insulation sleeve 60 preferably has a smaller outer circumference or diameter in the region of the longitudinal end 62 or on the outlet opening 64B than in the region of the longitudinal end 61. For example, insertion bevels 72 are provided on the longitudinal end 62, which facilitate the insertion of the insulation sleeve 60 into the shaft through-opening 42 of the laminated core 41. The longitudinal end 62 is designed, for example, as an insertion projection.

Preferably, the insulation sleeve 60 protrudes at the longitudinal end 62 with a tube portion 73 forming an insulation portion 76 from the end side 44 of the laminated core 41, so that electrical insulation is provided there between the motor shaft 30, 130, on the one hand, and the sheets 43, on the other hand.

In contrast, at the other longitudinal end 61, the flange body 68, which more or less protrudes or projects laterally from the shaft through-opening 42, ensures electrical insulation and also forms an insulation portion 76. Therefore, for example, an electrical insulation distance of, for example, approximately 8 mm to 10 mm, for example an air and creep distance, which is capable of electrical insulation with respect to the voltage P1, results both in the region of the flange body 68 and also on the tube portion 73.

A twist-lock contour 74 to engage in the twist-lock contour 47 of the laminated core 41 is preferably arranged on the radial outer circumference of the insulation sleeve 60, in particular over the entire longitudinal extension of the tube portion 63. The twist-lock contour 74 is designed, for example, as a twist-lock projection 74A, in particular as a longitudinal projection or a longitudinal rib 74B, which extends in parallel to the insertion axis S or rotational axis D.

The insulation sleeve 60 is accommodated in a clamp fit or press fit between the motor shaft 30, 130 and the laminated core 41. A friction lock is thus implemented.

In addition, a form fit is also provided by the twist-lock contours 47, 74, by means of which the insulation sleeve 60 is held in a formfitting manner on the laminated core 41 with respect to and/or transversely to the rotational axis D.

The formfitting contour 36, 136 of the motor shaft 30, 130 engages like teeth in the inner circumference of the tube portion 63, so that the motor shaft 30, 130 is also accommodated in the insulation sleeve 60 twist-locked with respect to its rotational axis D or longitudinal axis L and/or displacement-fixed with respect to the rotational axis D or the longitudinal axis L. The formfitting contour 36, 136 advantageously forms a counter formfitting contour on the inner circumference of the tube portion 36, thus, for example, plastically deforms the inner circumference of the tube portion 63, so that the formfitting contour 36, 136 is engaged in a formfitting manner with this counter formfitting contour. The plastic deformation or embossment of the counter formfitting contour results or forms, for example, during the insertion of the motor shaft 30, 130 into the insulation sleeve 60.

The insulation sleeve 60 thus enables the motor shafts 30, 130, which can be inserted directly without additional measures into the laminated core 141, to also be readily usable with the laminated core 41. Different motor shafts thus do not have to be constructed. The motor shafts 30, 130 are geometrically identical at the holding portions 33, which are provided for the connection to the laminated cores 41 or 141. For example, length and diameter of the holding portions 33 are identical. However, it is possible that different surfaces and/or surface contours are provided in the region of the holding portions 33 of the motor shaft 30 and 130 for the respective optimum hold of the laminated core 41 or 141.

Buttress projections 43A protruding in the shaft through-opening 42 or 142 preferably penetrate into the radial outer circumference of the tube portion 63 of the insulation sleeve 60 or the radial outer circumference of the holding portion 33 of the motor shaft 30, 130. For example, formfitting sections 75A, thus, for example, formfitting receptacles 75B, form on the insulation sleeve 60, in which the buttress projections 43A engage, schematically indicated in FIG. 5. The radial outer circumference of the tube portion 63 is displaced radially outward with respect to the insertion axis S or the rotational axis D, for example, by the motor shaft 30, wherein the buttress projections 43A penetrate into the tube portion 63 and preferably claw themselves therein.

The buttress projections 43A are provided, for example, on the end sides of the sheets 43 facing toward the shaft through-opening 42 or 142. Intervals, for example angular intervals and/or longitudinal intervals, are preferably provided between the buttress projections 43A, in particular between groups of buttress projections 43A, with respect to the rotational axis D. The buttress projections 43A hold the insulation sleeve 60 in the shaft through-opening 42 or the motor shaft 30, 130 in the shaft through-opening 142 in parallel to the rotational axis D and/or in the circumferential direction with respect to the rotational axis D. Multiple buttress projections 43A are preferably provided at angular intervals around the rotational axis D. The insulation sleeve 60 is displaced radially outward by the motor shaft 30 inserted therein, so that the buttress projections 43A penetrate, in particular penetrate in a claw-like manner, into the outer circumference or the jacket or the circumferential wall 66 of the insulation sleeve 60.

The rotors 40, 140 of the drive motors 20, 120 can be used together with a stator 80, which includes an excitation coil assembly 86. The excitation coil assembly 86 can include differently designed excitation coils 87, for example excitation coils 87 having more or fewer turns, having different conductor cross sections, or the like, in order to be suitable for the different voltages P1 and P2 and/or amperages of currents which flow through the excitation coils 87.

The stator 80 includes a laminated core 81 having a rotor receptacle 82 designed as a through-opening for the rotor 40, 140. The rotor 40, 140 is rotatably accommodated in the rotor receptacle 82, wherein a narrow air gap is provided in a way known per se between the laminated core 81 and the laminated core 41, 141.

The laminated core 81 includes sheets 83, for example electrical sheets or transformer sheets, the plate plane of which extends transversely to the rotational axis D of the drive motor 20, 120. The respective motor shaft 30, 130 protrudes from end sides 84, 85 of the laminated core 81, where it is rotatably mounted on bearings 24, 25 of a bearing assembly 24A.

The bearings 24, 25 are held on bearing receptacles 23 by bearing covers 21, 22, which frontally close the stator 80.

The bearings 24, 25 can be inserted, in particular pressed, into the bearing receptacles 23 of the bearing covers 21, 22. However, it is also possible that the bearings 24, 25 are extrusion coated or potted using the material of the bearing covers 21, 22.

For example, the bearing covers 21, 22 are permanently connected to the laminated core 41 or a carrier body 90 carrying the laminated core 41, for example screwed on, adhesively bonded, or preferably welded.

The bearing covers 21, 22 and the carrier bodies 90 are preferably made of plastic, in particular of a thermoplastic. The same plastic, for example the same thermoplastic, is preferably used for the bearing covers 21, 22 and the carrier bodies 90.

For example, the carrier body 90 is produced in a casting method, during which the laminated core 81 is potted.

The carrier body 90 includes bearing cover receptacles 91 for the bearing covers 21, 22. For example, circumferential walls 26 of the bearing covers 21, 22 are insertable, for example with their end sides, into the bearing cover receptacles 91. The bearing cover 21 is arranged closer to the output portion 34 of the motor shaft 30, 130. The bearing cover 22 on the region more remote therefrom. The bearing covers 21, 22 close the laminated core 81 on longitudinal end regions opposite to one another. The bearing cover 21 protrudes less from the end side of the laminated core 41, 141 than the bearing cover 22. The bearing cover 21 includes a receptacle space 21A for the flange body 68.

The bearing 24 is closer to the potentially current-conducting laminated cores 41, 81 than the bearing 25.

The bearing 24 and the bearing 25 are electrically conductively connected to the bearing portion 31 and thus the motor shaft 30, 130, so that as such the hazard exists that a voltage from the excitation coil assembly 86 will jump over to the motor shaft 30, 130.

However, a sufficient electrical insulation distance is provided by the electrically insulating flange body 68, so that this hazard no longer exists.

The bearing 25, in contrast, has a greater longitudinal distance with respect to the rotational axis D to the end side of the laminated cores 41, 81, so that the hazard of an electrical flashover from, for example, the excitation coil assembly 86 to the motor shaft 30, 130 also does not threaten here in the region of the bearing 25. Moreover, the electrically insulating tube portion 73 of the insulation sleeve 60, which protrudes from the laminated core 41 in the direction of the bearing cover 22, ensures sufficient electrical insulation.

The coil conductors 88 of the excitation coils 87 extend in the laminated core 81 through grooves 89, which are arranged, for example, in parallel to the rotational axis D or obliquely inclined thereto. The grooves 89 have insertion openings 89D, which are open to an inner circumference 82A of the rotor receptacle 82. The grooves 89 extend between the end sides 84, 85. The coil conductors 88 can be introduced into the grooves 89 through the insertion openings 89D and, for example, wound around winding heads or winding hammers of the laminated core 81.

The portions of the laminated core 81 facing toward the rotor receptacle 82 of the stator 80, which are located between the grooves 89, are covered by an inner lining 92, for example extrusion coated using plastic, but the grooves 89 are initially open, so that the coil conductors 88 can be laid therein.

The excitation coils 87 are furthermore wound around support projections 93 on the end side 84 of the stator 80, which more or less form winding heads.

On the opposite end side 85, support projections 94 are provided, which are also suitable for wrapping with coil conductors of excitation coils, but in some embodiments are not wrapped.

The end side 85 more or less represents the connection side of the drive motor 20, 120. Electrical connecting units 100 are provided there, to which, for example, connecting lines 15 for the electrical connection to the energizing unit 206, 306 are connectable or connected. The connecting lines 15 include a plug connector for plugging onto an energizing unit 206, 306. The connecting units 100 can also be referred to as terminals.

The connecting lines 15 can, for example, be plugged onto the connecting units 100 or also directly soldered thereon. The connecting units 100 include, for example, connecting contact regions 101 designed as contact projections, on which connecting plugs, which are connected to the connecting lines, can be plugged on. Furthermore, holes 102 are provided on the connecting contact regions 101, through which, for example, a connecting conductor of the connecting lines 15 can be led through and soldered to the connecting unit 100 or electrically connected in another way. For example, welding of such a connecting conductor to the connecting unit 100 would also be readily possible.

The connecting units 100 can be arranged using a plug installation on the carrier body 90. The carrier body 90 includes holders 95 for the connecting units 100. The holders 95 comprise sockets 96, into which the connecting units are insertable. The sockets 96 are provided between receptacle projections 97, which protrude from the end side 85 of the carrier body 90. For example, the receptacle projections 97 have grooves 98 opposite to one another, into which insertion projections 104 protruding laterally from the connecting units 100 are insertable, for example like a tongue-and-groove connection.

The insertion projections 104 protrude laterally from a base body 103 of a respective connecting unit 100. The insertion projections 103 protrude transversely to the longitudinal extension of the connecting contact region 101 from the base body 103. The insertion projections 104 and the connecting contact region 101 overall form an approximately T-shaped configuration. For example, the base body 104 more or less forms a base leg, from which the insertion projections 104 protrude laterally like lateral legs. However, the base planes of the insertion projections 104 and the base body 103 are different. A transition section 106, which includes, for example, S-shaped curves or arc sections or curves or arc sections opposite to one another, is provided between the base body 103 and the insertion projections 104. Therefore, the insertion projections 104 thus protrude from a rear side 115 of the base body 103.

At the free end regions protruding from the base body 103, the insertion projections 104 have formfitting contours 105, in particular gear teeth 105A, barbs, or the like, using which a formfitting hold in the socket 96 is possible. The insertion projections 104 can preferably more or less claw into the socket 96 of the carrier body 90 by means of the formfitting contours 105. In particular, melting of the carrier body 90 in the region of the sockets 96, in particular the grooves 98, upon heating of the connecting unit 100, which is also described hereinafter, has the result that a formfitting connection is established, on the one hand, between the insertion projections 104, in particular the formfitting contours 105 thereof, and, on the other hand, the material of the carrier body 90 in the region of the socket 96, in particular in the region of the grooves 98.

The gear teeth 105A include, for example, an interlacing, i.e., for example, a tooth 105B protrudes from the insertion projection transversely to the main plane of the insertion projection 104.

The connecting units 100 include conductor receptacles 107 for accommodating the respective portion of a coil conductor 88 to be connected. The conductor receptacles 107 are formed between, on the one hand, the front side 114 of the base body 103 and, on the other hand, a receptacle arm 108 of the connecting unit 100, which is connected by means of a connection portion 109 to the base body 103. In particular, it is advantageous if the base body 103, the connection portion 109, and the receptacle arm 108 are integral. The lateral legs or insertion projections 104 of the base body 103 are preferably also integral with it. An inside of the connection portion 109 facing toward the conductor receptacle 107 forms a receptacle section or a receptacle trough 116A of the conductor receptacle 107.

The conductor receptacle 107 includes a support surface 107A and a narrow side 107B angled thereto in the region of the receptacle trough 116A. An oblique surface 107C obliquely inclined to the support surface 107A and to the narrow side 107B for supporting the at least one coil conductor 88 is arranged between the narrow side 107B and the large support surface 107A. The oblique surface 107C can be, for example, a chamfer, a curved or arched surface, or the like. In any case, the oblique surface 107C prevents the coil conductor 88 from resting on a sharp edge.

The connecting unit 100 is advantageously embodied as a stamped-bent part, which is first stamped out of a base material and then brought into the above-described form by corresponding shaping.

Figure 12:
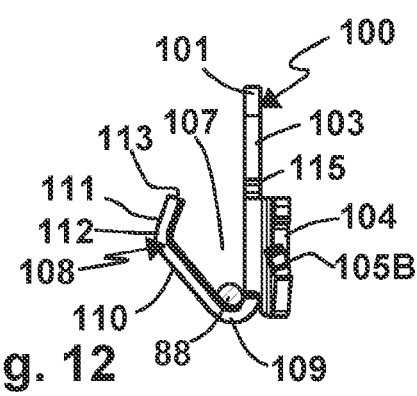
Figure 13:
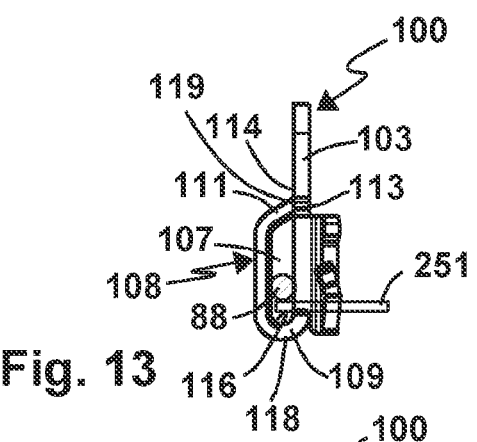
Figure 14:
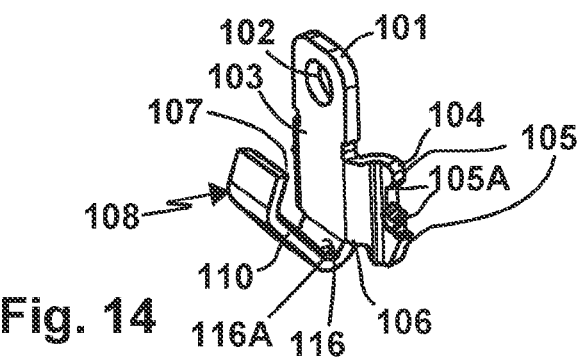
FIG. 14 shows a perspective illustration of the connecting unit according to FIG. 12.
Figure 15:
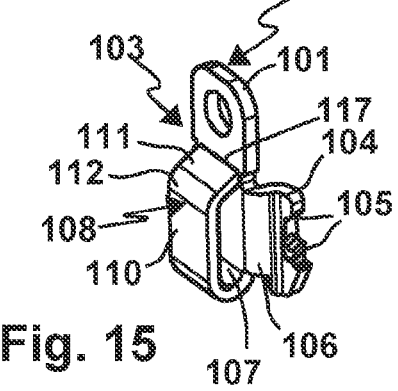
FIG. 15 shows a perspective illustration of the connecting unit according to FIG. 13.
Figure 24:
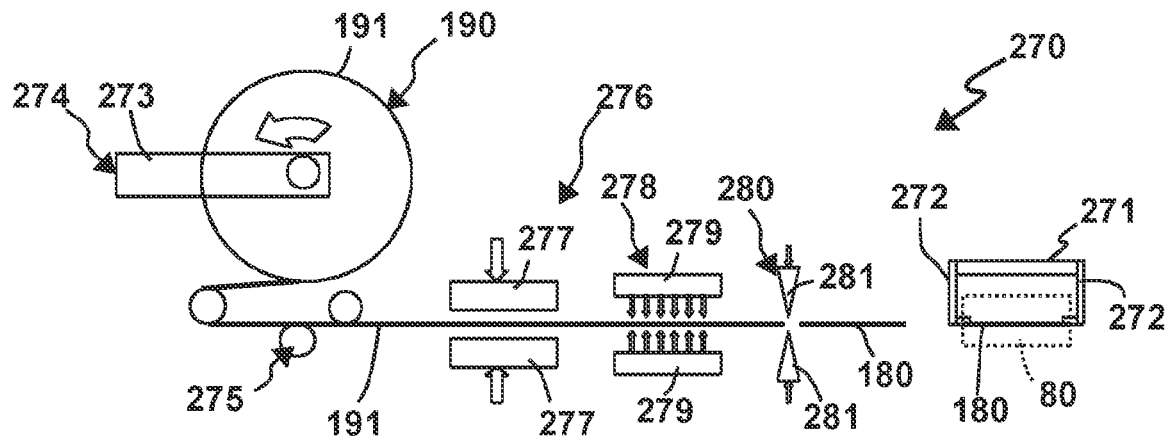
FIG. 24 shows a schematic illustration of an installation unit for producing the groove cover according to FIG. 19 and its installation on the stator according to FIGS. 21 to 23.
Figure 25:
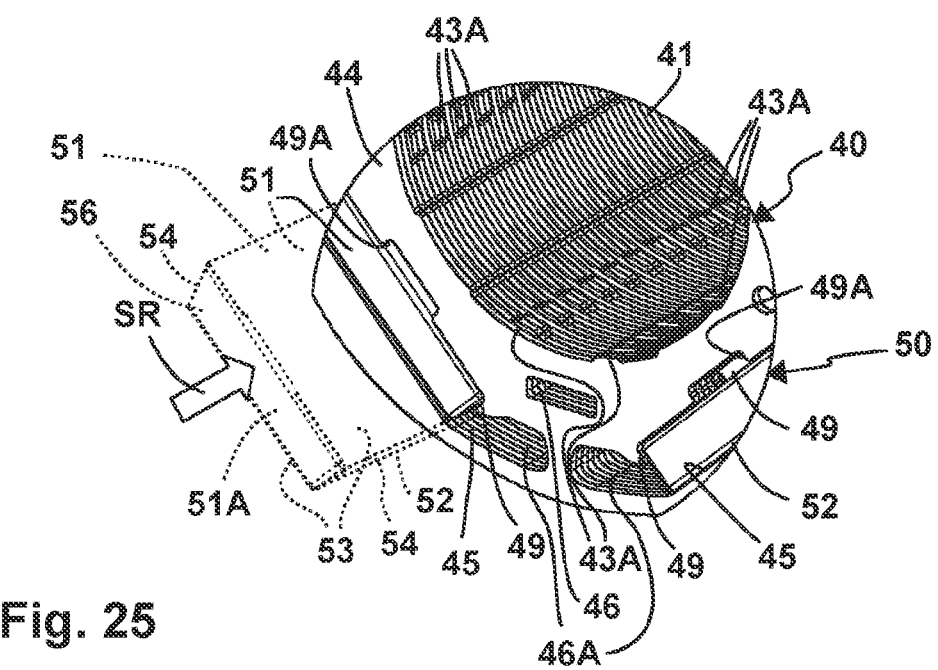
FIG. 25 shows a perspective diagonal view of a detail of a rotor of the above-mentioned motor, approximately corresponding to a detail D5 in FIG. 6.
Figure 26:
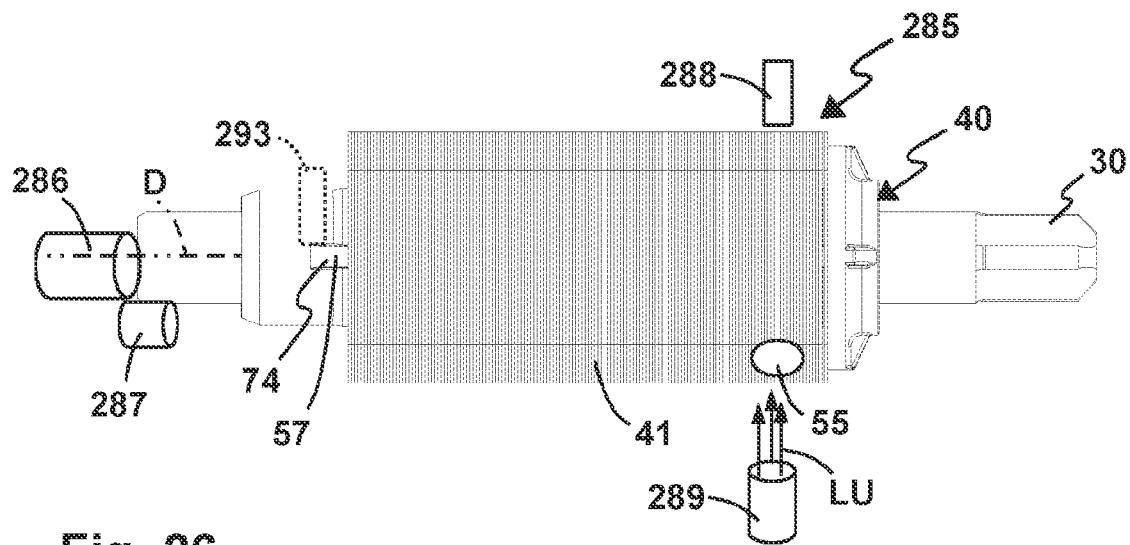
FIG. 26 shows a schematic illustration of a balancing unit for balancing the rotor according to the above figure.
Figure 27:
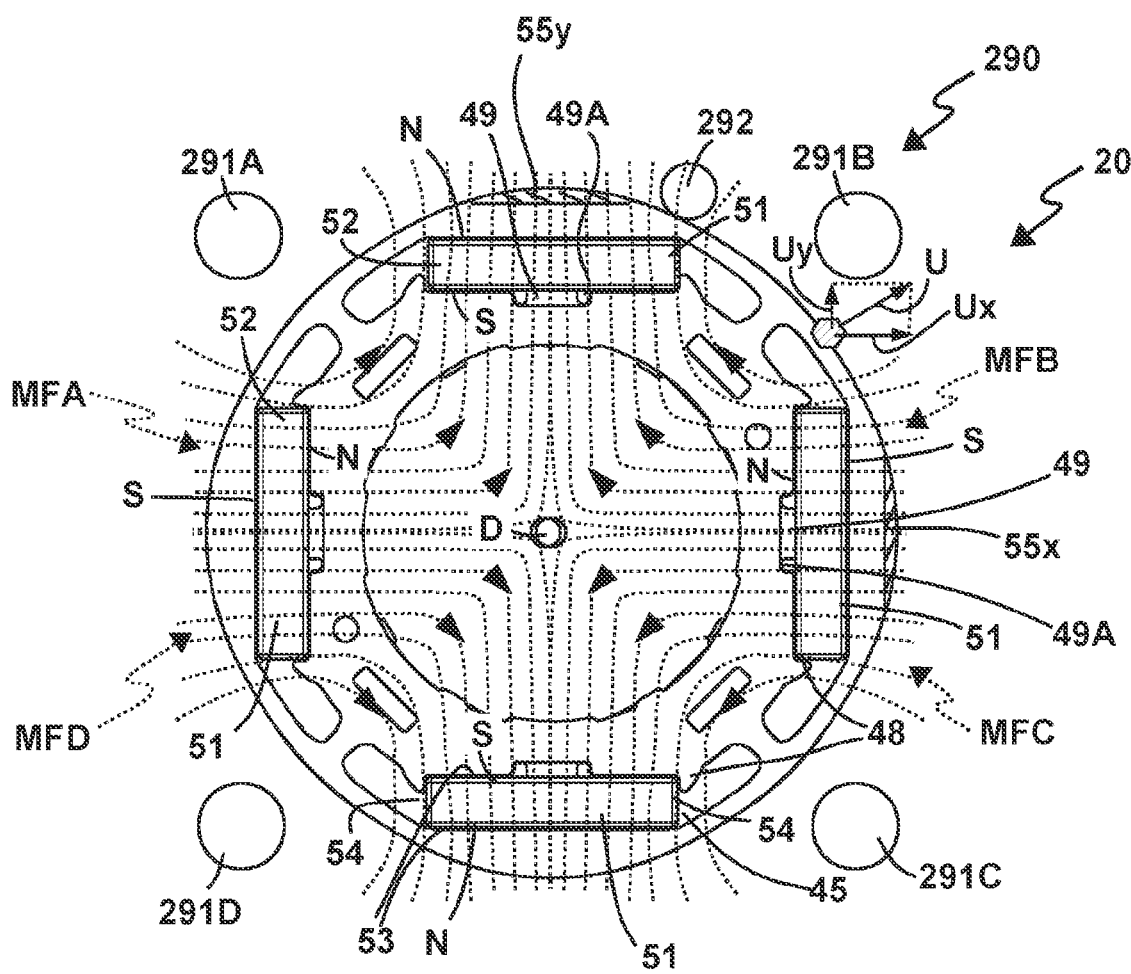
FIG. 27 shows a schematic frontal view of the rotor according to the above figure with a magnetizing device.

The installation and/or fastening and/or electrical contacting of the coil conductor 88 in the conductor receptacle 107 is structured as follows:

The conductor receptacle 107 is initially open, specifically in that the receptacle arm 108 still protrudes far from the base body 103, see, for example, FIGS. 12 and 14. The coil conductor 88 can move down to the bottom 116, i.e., the inner circumference of the connection portion 109, of the conductor receptacle 107, see, for example, FIG. 12. However, this configuration is rather undesired, so that the coil conductor 88 is held in a position remote from the bottom 116 of the conductor receptacle 107 by additional support measures, for example by a support 251 of an installation unit 250.

Figure 10:
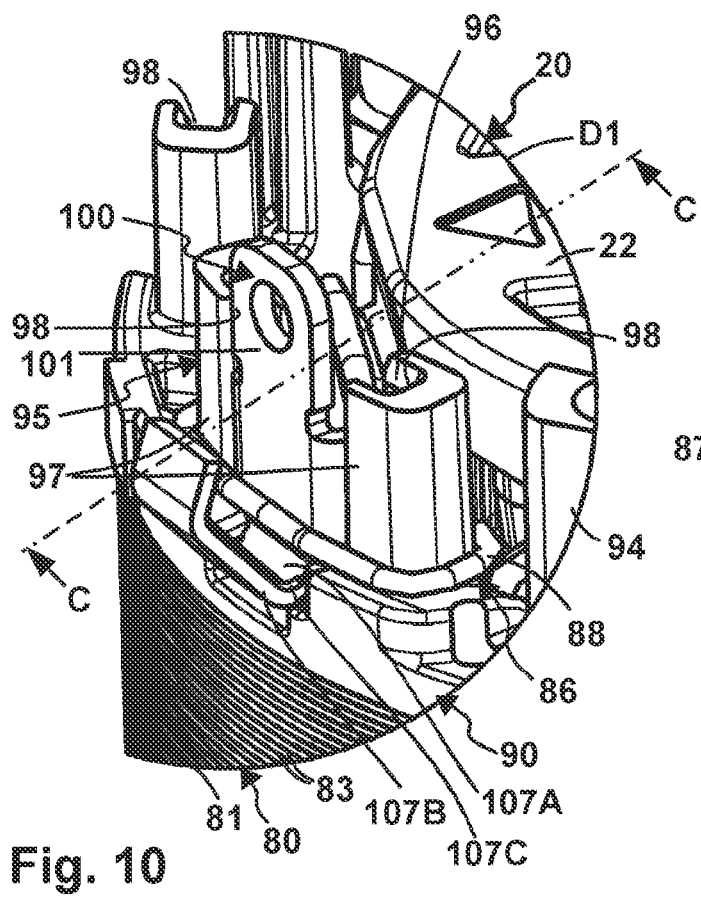
FIG. 10 shows a perspective diagonal view of the stator according to FIG. 1, approximately corresponding to a detail D2 in FIG. 1.

However, the configuration is preferably made so that the carrier body 90 includes a support contour 99, on which the coil conductor 88 is supported during the installation or during the closing of the connecting unit 100, see FIGS. 10 and 11. The coil conductor 88 thus rests on the support contour 99, so that it does not touch the bottom 116. The support contour 99 is provided, for example, on an outside of the receptacle projections 97 facing away from the grooves 98. For example, the support contour 99 is embodied as a step between the respective receptacle projection 97 and the section of the carrier body 90 from which the receptacle projection 97 protrudes.

Figure 11:
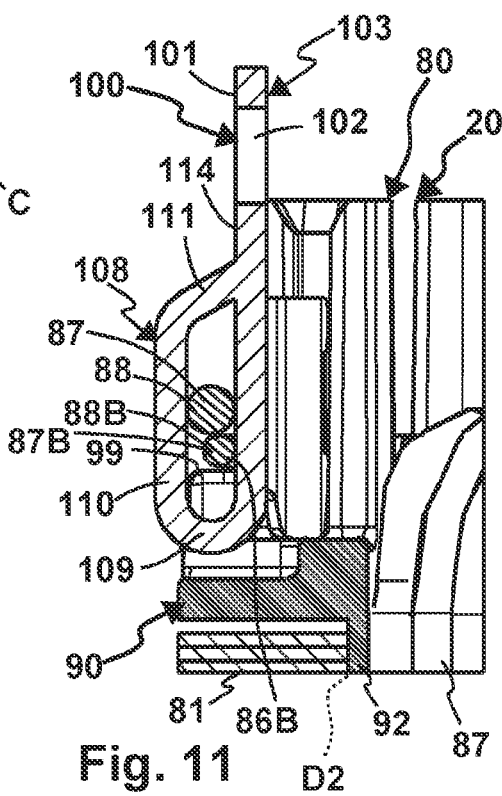
FIG. 11 shows a section along a section line C-C through the stator according to FIG. 10 to illustrate a connecting unit, which in FIG. 12 is shown laterally in the open state and in FIG. 13 is shown laterally in the closed state.

The position of the coil conductor 88 raised off of the bottom 116 is advantageous for the following closing and welding operation. It is advantageous in particular if coil conductors having smaller cross section are used, for example a coil conductor 88B (FIG. 11). This coil conductor 88B can then itself have a distance from the bottom 116, which heats up significantly during the welding process described hereinafter, if the receptacle arm 108 is moved toward the base body 103, so that it presses with its free end 113 against the front side 114 of the base body 103.

The coil conductor 88B forms, for example, a component of an excitation coil 87B of an excitation coil assembly 86B.

The receptacle arm 108 has a closing leg 111, which protrudes at an angle from a middle arm portion 110 of the receptacle arm 108, on its end region facing away from the connection portion 109. For example, a curved portion or connection portion 112 is provided between the middle arm portion 110 and the closing leg 111. The closing leg 111 protrudes from the middle arm portion 110 in the direction of the front side 114 of the base body 103, so that its free end 113 touches the front side 114 in the closed state of the conductor receptacle 107, while a distance, which defines the conductor receptacle 107, is provided between the middle arm portion 110 and the front side 114 of the base body 103.

A welding gun 252 of the installation unit 250 is used for closing the connecting units 100 and welding. The welding gun 252 includes gun arms 253, 255, on the free end regions of which, which are provided for the contact with the connecting unit 100, support surfaces 254, 256 are provided. The free end regions of the gun arms 253, 255, which are provided to engage with the connecting unit 100, taper to a point, thus form points 257. In particular in the case of the gun arm 253, which has a supporting effect with its support surface 254 on the rear side 115 of the connecting unit 100, this pointed, narrow design of the gun arm 253 is advantageous.

The gun arms 253, 254 are arranged in a V shape, so that the points 257 engage from sides opposite to one another on the connecting unit 100 (see FIG. 16), close it, and subsequently weld it.

Longitudinal axes L1, L2 of the gun arms 253, 255 preferably extend at an angle W, in particular approximately 20° to 40°. Thus, in particular the point 257 of the gun arm 253 can enter the intermediate space between bearing cover 22 and rear side 115 of the connecting unit 100 and support the base body 103 there with its support surface 254.

The gun arm 254 acts in terms of closing the conductor receptacle 107 on the receptacle arm 108. For example, the curved portion 112 presses against the support surface 256 of the gun arm 255. The support surfaces 254, 256 are oriented in parallel or essentially in parallel to one another when the support surface 254 moves toward the support surface 256, which is shown as the feed movement VS in the drawing. Therefore, the gun arm 253 thus remains stationary and supports the connecting unit 100 on the rear side, while the gun arm 255 adjusts the receptacle arm 108 in the direction of the base body 103. Its free end 113 of its closing leg 111 then comes into contact with the front side 114 of the base body 103 of the connecting unit 100. The conductor receptacle 107 is therefore closed and a receptacle eye 119A is formed.

It is also possible that a welding gun or similar other milling device reshapes the receptacle arm 108 from an initially elongated, linear shape, in which the closing leg 111 is not yet formed, for example, into a receptacle arm 108 having closing leg 111, for example on the basis of a schematically indicated deformation contour 259 on the gun arm 255.

The gun arms 253, 255 are then energized by an energizing unit 258 in that the gun arms 253, 255 have different potentials and thus generate a current flow through the connecting unit 100.

The welding current IS flows through the more or less ring-shaped closed connecting unit 100, i.e., through the sections of the connecting unit 100 which close the conductor receptacle 107, namely the base body 103 in the region of the conductor receptacle 107 and the receptacle arm 108. The welding current IS flows via connection regions 118 and 119, namely, on the one hand, via the connection portion 109, but also, on the other hand, via a contact region 117 between the free end 113 of the closing leg 111 and the front side 114 of the base body 103. A large amount of heat occurs both in the contact region 117 and also in the region of the bottom 116, which does not damage the coil conductors 88 or 88B, however, because they have a distance to the bottom 116, but also to the upper contact region 117. Nonetheless, the connecting unit 100 becomes sufficiently hot in the region of the conductor receptacle 107 that a paint or other similar insulation of the coil conductors 88 melts and they come into electrical contact with the surfaces of the connecting unit 100.

The connecting unit 100 is therefore more or less mechanically closed and subsequently welded to those coil conductors 88 which are accommodated in the conductor receptacle 107. The installation is, on the one hand, protective for the coil conductors 88, but, on the other hand, also reliable and highly durable, namely because the coil conductors 88 can be somewhat mechanically changed by the above-mentioned pressing process and the welding process, but are not weakened or changed in their cross-sectional geometry in such a way that they break, for example, during the operation of the drive motor 20, 120.

When the excitation coils 87 are inserted in the grooves 89, they are closed by groove covers 180.

The groove covers 180 include a profile body 181. The groove covers 180 preferably consist of plastic and/or an electrically insulating material. The profile body 181 is embodied, for example, as a plastic part or plastic wall body.

The profile body 181 forms a wall body 182 which more or less represents a closure wall for a respective groove 89.

The groove cover 180 or the profile body 181 has a long design and extends along a longitudinal axis L8, which extends in parallel to a longitudinal axis L9 of the groove 89, when the groove cover 180 is installed in the groove 89. Longitudinal narrow sides or long sides 195 of the groove cover 180 extend along the longitudinal axis L8. The longitudinal sides 195 have a transverse distance Q transversely to the longitudinal axis L8.

Longitudinal end regions 183 of the groove cover 180 preferably protrude from the laminated cover 81 up to the carrier body 90, so that electrical insulation is provided over the entire length of a groove 89. Adhesive bonding, welding, or similar other fastening on one or both of the bearing covers 21 or 22 is advantageous there, for example.

The groove cover 181 includes a wall section 184, which completely covers the groove 88 transversely to the longitudinal axis L8. The wall section 184 is approximately U-shaped or arched in cross section, thus transversely to the longitudinal axis L8, and forms formfitting projections 186 on its transverse end regions, thus transversely to the longitudinal axis L8, which are provided to engage in formfitting receptacles 89B of the grooves 89. Transversely to the longitudinal axis L8, the groove cover 180 includes two formfitting receptacles 186, which form sections of the groove cover 180 protruding farthest transversely to the longitudinal axis L8 and/or are opposite to one another. The formfitting projections 186 and the formfitting receptacle 89B form formfitting contours 185, 89A, which hold the groove cover 180 in the groove 89 transversely to the longitudinal axis L8, which simultaneously represents the longitudinal axis of the groove 89.

The wall section 184 forms a trough-shaped formation between the formfitting contours 185, and thus has a bottom 187. The bottom 187 is, for example, bulging into the respective groove 89, thus extends therein. Of course, a reverse configuration would also be possible, in which the wall section 184 does not protrude radially outward with respect to the rotational axis D, but rather radially inward. However, it would possibly be in the way of the rotor 40, 140 there.

Lateral legs 188 extend away from the wall section 184. The lateral legs 188 are inclined toward one another, i.e., their free end regions remote from the wall section 184 are inclined toward one another. The lateral legs 188 and the wall section 184 in the transition region to the lateral legs 188 thus form the formfitting contour 185, which is V-shaped in a side view, thus a formfitting projection 186.

The installation of the groove cover 180 is structured as follows:

As such, it would be possible to insert the groove cover 180 into a respective groove 89, for example, from one of the end sides 84 or 85, i.e., along an insertion axis which extends in parallel to the rotational axis D. However, the formfitting contours 185 are movable toward one another transversely to the longitudinal axis L8, so that a transverse distance Q between the formfitting contours 185 can be reduced, so that the groove cover 180 can be pushed into the groove 89 past a side edge 89C of the groove 89, see FIGS. 21 to 23 in this regard. In this case, the wall section 184 slides with its rounded outside 189, thus on its side opposite to the bottom 187, which thus forms a displacement contour 189A, past the side edges 89C, wherein the wall section 184 yields flexibly, in this regard thus forms a flexible section 194. At the same time, the lateral legs 188 and the formfitting contours 185 are moved toward one another in terms of narrowing the transverse distance Q and finally at the end of this insertion movement SB, the groove cover 180 locks in the groove 89, i.e., the formfitting contours 185 engage with the formfitting contours 89A.

The groove cover 180 is then accommodated in a formfitting manner in the groove 89, namely in two directions orthogonal to one another transversely to the longitudinal axis L8.

A surface of the formfitting receptacle 89B facing away from the rotor receptacle 82 forms an engage-behind contour 89E. A surface of the formfitting receptacle 89B facing toward the rotor receptacle 82 forms a support contour 89F.

The engage-behind contour 89E and/or the support contour 89F are preferably planar.

The engage-behind contour 89E and/or the support contour 89F preferably support the groove cover 180 over its entire longitudinal axis L8.

The lateral legs 188 include engage-behind surfaces 188A, which are supported on the engage-behind contour 89E. Sections of the wall portion 184 adjoining the lateral legs 188 include support surfaces 188B or form these support surfaces, which are supported on the support contours 89F. Therefore, the engage-behind contours 89A support the groove cover 180 in the direction of the interior of the rotor receptacle 82 or the rotational axis D and the support contours 89F in opposition thereto, thus in the direction radially outward with respect to the rotational axis D or a bottom of the respective groove 89.

The advantage of this construction method also results in that, for example, the carrier body 90 can protrude somewhat radially inward in the direction of the rotor receptacle 82 at the longitudinal end regions of the groove 89 when the groove covers 180 are installed. This is because the longitudinal end regions 183 thereof can then be brought into engagement behind in the direction of the rotor receptacle 82 of the protruding section of the carrier body 90.

Furthermore, the engage-behind surfaces 188A and the engage-behind contours 89E as well as the support surfaces 188B and the support contours 89F press flatly against one another, so that a sealed seat or a seal of the groove 89 is implemented and/or the groove cover 180 seals closed the groove 89.

The groove covers 180 advantageously have a seal function for sealing off the grooves 89, but no support function for the excitation coils 87 of the excitation coil assembly 86. The oblique inclination of the engage-behind contours 89E and the engage-behind contours 188A rather even acts in terms of a release bevel, which, upon an application of force to the groove cover 180 in a direction out of the groove 89 or radially inward with respect to the rotational axis D, causes a deformation or narrowing of the groove cover 180 and thus facilitates or enables its release from the groove 89.

An alternative exemplary embodiment according to FIG. 23B, which is only schematically shown, provides, for example, a groove 489 designed alternatively to the groove 89, into which a groove cover 480 is introduced. The groove cover 480 includes formfitting receptacles 486 on its longitudinal narrow sides, which are engaged with formfitting projections 489B of the groove 489. The formfitting projections 489B are opposite to one another. The formfitting receptacles 486 and the formfitting projections 489B are complementary to one another, for example V-shaped.

Surfaces of the formfitting projections 489B facing away from the rotor receptacle 82 form engage-behind contours 489E. Surfaces of the formfitting projections 489B facing toward the rotor receptacle 82 form support contours 489F. The engage-behind contour 489E and/or the support contour 489F are preferably planar. The engage-behind contour 489E and/or the support contour 489F preferably support the groove cover 480 over its entire longitudinal axis L8. The long sides of the groove cover 480 or the formfitting receptacles 486 include engage-behind surfaces 488A, which are supported on the engage-behind contours 489E. The formfitting receptacles 486 furthermore include support surfaces 488B or form these support surfaces, which are supported on the support contours 489F.

The mechanical structure of the stator 80 is preferably entirely or partially identical for both voltage levels P1 and P2. In particular, the rotor receptacle 82 for the rotor 40, 140 is identical, thus, for example, has the same diameter. The design of the grooves 89, thus, for example, their formfitting contours 89A and/or their width and/or depth are also identical. It is also advantageous if the groove cover 180 is usable or used on the stator 80 independently of whether the excitation coil assembly 86 is designed and/or arranged for the voltage P1 or the voltage P2. An extensive equivalent part principle is thus implementable.

It is possible to provide the groove covers 180 as individual profile parts, i.e., that they already have the elongated design shown in FIG. 20 and have lengths corresponding to the length of the groove 89.

However, one advantageous embodiment provides that the groove covers 180 are obtained from a roll material 190. The roll material 190 is provided, for example, as a coil 191. The coil 191 is rotatably accommodated on a coil carrier 273, for example, in particular a corresponding holding stand. An unwinding device 274 unwinds the roll material 190 from the coil 191.

A portion 192 of the roll material 190 unwound from the coil 191 passes through, for example, a roll assembly 275 having one or more rolls, in particular deflection rolls or guide rolls.

Downstream of the roll assembly 275, a smoothing unit 276 is provided, in which the portion 192 is smoothed, so that its originally rounded formation on the coil 191 is transferred into an elongated formation. The smoothing unit 276 comprises, for example, at least one pressing element 277, in particular pressing elements 277 opposite to one another, and/or a heating device 278 having heating bodies 279, in order to bring the roll material 190 of the portion 192 into an elongated formation, as shown in FIG. 20. The roll material 190 is thus brought by the smoothing unit 276 into a linear elongated shape.

A cutting unit 280 adjoins the smoothing unit 276, using which a length is cut to length in each case from the portion 192, which corresponds to a desired groove cover 180, thus, for example, the length of the laminated core 81 or the carrier body 90. The cutting unit 280 includes, for example, cutting elements 281, in particular cutters, blades, sawing elements, or the like.

It is to be noted at this point that instead of the laminated core 181 or stator 80, other, i.e., shorter or longer stators can be provided with groove covers by means of the installation unit 270. Respective suitable groove covers 180 are thus produced as needed, the length of which is adapted to the length of the stator to be equipped. The cutting element 280, for example a blade cutter, thus cuts off a groove cover 180 in each case from the portion 192, which is then grasped by a holding element 271 and inserted in the stator 80.

The holding element 271, for example a gripper, comprises holding arms 272, which can grasp the profile body 181 or the groove cover 180 on its longitudinal end regions 183 and can insert it into the groove 89 by means of the insertion movement SB. It would readily be possible that the holding element 271 includes a suction unit or similar holding element, which suctions on the groove cover 180 in the region of the bottom 187 and inserts it with a force component generating the insertion movement SB into the groove 89.

It can thus be seen that by inserting, joining, pressing and the like, essential components of the motor 20, 120 are to be produced, namely, for example, the connecting units 100, the cover of the grooves 89 by means of the groove covers 180.

The magnetization described hereinafter of the magnets 51 also follows this installation concept.

This is because the magnets 51 are initially not yet magnetized during the installation on the rotor 40, 140 or laminated core 41, 141. A magnetizable material 51A of a respective magnet body 56 is thus initially not magnetic when the magnet body 52, which is not yet magnetic as such, is inserted or pressed in the context of an insertion process or pressing process into one of the holding receptacles 45. The magnetizable material 51A is, for example, neodymium-iron-boron (NdFeB), advantageously with an additive of dysprosium, or samarium-cobalt (SmCo).

For example, support projections 48 are provided on the holding receptacles 45, which support narrow sides 54 of a respective magnet body 52. The narrow sides 54 extend in parallel to the rotational axis D in the state of the magnets 50 installed on the rotor 40, 140. The magnet bodies 52 or magnets 51 are preferably clamped between the support projections 48.

Flat sides 53 having larger areas than the narrow sides 54 extend between the narrow sides 54. Normal directions of the flat sides 53 are preferably radial to the rotational axis D.

The laminated cores 41, 141 include holding projections 49 for holding the magnet bodies 52. The holding projections 49 protrude, for example, toward the flat sides 53 and press with their free end regions against the flat sides 53. It is preferred if the holding projections 49 more or less claw together and/or form buttress projections with the magnet body 52.

The sheets 43 of the laminated cores 41, 141 comprise sheets 43 which have recesses 59A in a predetermined angular position with respect to the rotational axis D. The recesses 59A preferably extend radially with respect to the rotational axis D away from one of the flat sides of the respective holding receptacle 45, for example radially inward toward the rotational axis D. It is preferred if the recesses 59A are arranged in succession in an axial line in parallel to the rotational axis D, thus are aligned with one another. Some of the sheets 43 have holding projections 59 protruding into the recesses. The holding projections 59 furthermore protrude into the insertion cross section of a respective holding receptacle 45, so that upon insertion of a magnet body 52 into a holding receptacle 45, they engage with the magnet body 52 and are bent over by the magnet body 52 in an insertion direction SR, in which the magnet body 52 is inserted into the holding receptacle 45. A holding projection 59 can be displaced here into the recess 59A of one or more adjacent sheets 43. An end side of a respective holding projection 59, which is the width of a narrow side of a sheet 43, is then supported obliquely inclined on the flat side 53 of the magnet body 52 and prevents the magnet body 52 from being pulled out of the holding receptacle 45 against the insertion direction SR.

The magnet bodies 52 or magnets 51 are preferably accommodated in the clamp fit in the holding receptacle 45. Of course, adhesive bonding, welding, or similar other installation would be entirely possible. The magnetizable material 51A is thus inserted into the respective laminated core 41, 141 in the not yet magnetized state.

The rotor 40, 140 is then balanced by means of a balancing unit 285. In this case, the motor shaft 30, 130 and possibly the insulation sleeve 60 is already installed. Therefore, the rotor 40, 140 can thus be rotated by means of the motor shaft 30, 130 around its rotational axis D by means of a motor 286. A measuring unit 287 establishes, for example, imbalances of the rotor 40, 140.

Still existing imbalances are then remedied in that, for example, at least one balancing section 55 is produced, for example, by means of a material-reducing unit 288, for example a grinding unit, a milling unit, or the like. In this case, for example, material of the laminated core 41, 141 is removed where balancing is necessary, wherein chips, metal dust, or the like result. However, this is not problematic since the magnet bodies 52 are not yet magnetized when the material of the laminated core 41, 141 is machined. The chips, dust, or the like which result due to removal of the sheets 43 do not magnetically adhere to the laminated core 41, 141, so that they are easily removable. During the later operation of the drive motor 20, 120, no metal chips or dust are thus present, which can damage, for example, the bearings 24 or 25.

It is advantageous if the balancing sections 55 are attached to those regions of the laminated core 41, 141 where the laminated core 41, 141 has the greatest possible material thickness or thickness in the radial direction with respect to the rotational axis D, i.e., in particular on the radial outside with respect to the magnets 51.

Thus, for example, if an imbalance U occurs at a region unfavorable for producing a balancing section, vectorial balancing is preferred in which the imbalance U is decomposed into force vectors Ux and Uy and, for example, balancing sections 55x and 55y are produced corresponding to these vectors by the material-reducing device 288 on the radial outside on the laminated core 41, 141. The balancing sections 55x and 55y are located, for example, radially outside on the laminated core 41, 141 from holding receptacles 55, which are arranged at an angular interval in relation to the imbalance U directly adjacent thereto.

In the rotor 40, 140, no balancing bodies or balancing weights are necessary on the end sides 44. Thus, for example, the inflow openings and outflow openings of the air ducts 46 are not covered by balancing weights or balancing bodies. Furthermore, air can also flow laterally past the magnets 51, namely through air ducts 46A, which are provided on the holding receptacles 45 or are provided by the holding receptacles 45. The inflow openings and outflow openings of the air ducts 46A are also not covered by balancing weights or balancing bodies.

A cleaning unit 289, for example a blowing unit, a brushing unit, and/or a vacuum cleaner or the like, can readily remove the metallic particles resulting during the material removal by the material-reducing unit 288 from the rotor 40, 140, in particular the respective laminated core 41, 141, as long as the magnet bodies 52 are not magnetic. For example, the cleaning device 289 generates an air jet LU, which removes chips and the like from the region of the balancing section 55.

When the rotor 40, 140 is balanced, it is magnetized by means of a magnetizing unit 290, i.e., in particular the magnet bodies 52 are magnetically activated. The magnetizing unit 290 includes, for example, magnetizing heads 291A, 291B, 291C, 291D.

For example, the magnetizing unit 290 comprises a positioning unit 292, which positions, in particular pivots, the motor shaft 30, 130 in such a way that the magnets 51 are exactly opposite to the magnetizing heads 291 at the correct angle.

The rotor 40, 140 is advantageously positioned by means of a mechanical coding 57 with respect to the magnetizing heads 291A, 291B, 291C, 291D in such a way that one magnetizing head 291A, 291B, 291C, 291D is arranged in each case between adjacent magnets 51.

For example, the twist-lock contour 74 is used as the coding 57, which strikes on a stop 293, for example, in particular a rotational stop, of the magnetizing device 290, so that the rotor 40, 140 is arranged at the correct rotational angle with respect to the magnetizing heads 291. The stop 293 is shown in conjunction with the balancing unit 285.

However, other components of the rotor 40 can readily be used as the coding 57, for example the air ducts 46, which can engage in corresponding stops of the magnetizing unit 290 and/or which are optically acquirable. An optical acquisition of the rotational angle position of the rotor 40, 140 is advantageously also possible, for example by a camera or similar other optical sensor of the magnetizing unit 290.

The magnetizing heads 291A, 291B, 291C, 291D generate magnetic fields MFA, MFB, MFC, MFD, which penetrate the magnet bodies 52 or magnets 51 arranged adjacent to one another at an angular interval with respect to the rotational axis D so that they are permanently magnetized and form magnetic poles, which are indicated as north poles N and south poles S. The magnetic fields MFA, MFB, MFC, MFD are indicated in dashed field lines having errors corresponding to the magnetic flux direction in the drawing.

When the magnets 51 of the rotors 40, 140 are magnetized, the rotors 40, 140 are installed on the stator 80.

It is obvious that multiple magnet bodies 52 or magnets 51 are also arrangeable in the holding receptacles 45 for the magnets 51, for example a series arrangement of two or more magnet bodies 52 are magnets 51 in parallel to the rotational axis D. Magnetizing of the respective magnet bodies 52 is also readily possible in this case when they are already accommodated in the holding receptacles 45.

In the case of the magnetizing by the magnetizing device 290, it is also advantageous that the sheets 43 of the laminated cores 41, 141 are magnetically conductive, so that they can optimally conduct the magnetic fields 292 of the magnetizing device 290 through the magnet bodies 52.

The invention claimed is:

1. A drive motor for a suction device or a machine tool in the form of a handheld power tool or a semi-stationary machine tool, wherein the drive motor includes a stator having an excitation coil assembly and a rotor having a motor shaft, which is rotatably mounted around a rotational axis on the stator or with respect to the stator by means of a bearing assembly, wherein the drive motor includes a connecting unit for electrically connecting the drive motor to an energizing unit for energizing the excitation coil assembly, wherein the connecting unit includes a base body for fastening on the stator and a receptacle arm protruding from the base body, between which a conductor receptacle for at least one electrical coil conductor of an excitation coil of the excitation coil assembly is formed, and wherein the connecting unit includes a connecting contact region for electrically connecting a connecting line for the connection to the energizing unit and wherein the receptacle arm and the base body are connected to one another by means of two electrically conductive connection regions and form a receptacle eye enclosing the conductor receptacle in a ring shape, so that the conductor receptacle has a closed state, and a welding current between the base body and the receptacle arm can flow past the conductor receptacle via the electrical connection regions, and wherein an electrical connection region between the base body and the receptacle arm is arranged between two support contours of the stator, wherein the support contours support the at least one coil conductor at a distance to the inpput particular trough-shaped connection region.

2. The drive motor as claimed in claim 1, wherein the receptacle arm is adjustable from a position spaced apart from the base body, in which the conductor receptacle has an open state and is open on one side for the insertion of the at least one coil conductor, into a position adjusted toward the base body, in which the conductor receptacle has the closed state.

3. The drive motor as claimed in claim 1, wherein a free end of the receptacle arm is in touch contact with the base body to form one of the electrical connection regions before and during the energizing using the welding current.

4. The drive motor as claimed in claim 1, wherein the receptacle arm is welded at one or both electrical connection regions to the base body.

5. The drive motor as claimed in claim 1, wherein the receptacle arm is permanently connected to or integral with the base body by means of a connection portion.

6. The drive motor as claimed in claim 5, wherein the connection portion forms one of the electrical connection regions.

7. The drive motor as claimed in claim 5, wherein the connection portion has an arched or curved profile and/or is V-shaped or U-shaped and/or forms a receptacle trough or a bottom of the conductor receptacle.

8. The drive motor as claimed in claim 1, wherein the receptacle arm includes an arm portion, which is opposite to a front side of the base body in the region of the conductor receptacle in the closed state of the conductor receptacle at a distance suitable for receiving the at least one coil conductor.

9. The drive motor as claimed in claim 8, wherein the arm portion protrudes at a larger angle from the front side of the base body in the open state of the conductor receptacle than in the closed state of the conductor receptacle.

10. The drive motor as claimed in claim 8, wherein the receptacle arm includes a closing leg protruding from the arm portion that protrudes from the arm portion in the direction of the front side of the base body.

11. The drive motor as claimed in claim 8, wherein the arm portion extends essentially in parallel to the front side of the base body in the closed state of the conductor receptacle, and/or wherein the conductor receptacle includes, in the region of the arm portion, a longitudinal formation for accommodating multiple coil conductors in a series arrangement in parallel to the longitudinal extension of the arm portion.

12. The drive motor as claimed in claim 1, wherein the base body includes at least one insertion projection to be plugged into a socket of the stator.

13. The drive motor as claimed in claim 12, wherein the at least one insertion projection protrudes laterally from the base body and/or the receptacle arm and/or an insertion projection protrudes from the base body in each case on opposing sides.

14. The drive motor as claimed in claim 12, wherein the at least one insertion projection includes, on its free end region protruding from the base body, at least one formfitting contour for formfitting engagement in the socket of the stator.

15. The drive motor as claimed in claim 12, wherein the at least one insertion projection is arranged on a portion of the base body delimiting the conductor receptacle and/or a free end region of the at least one insertion projection and the base body are located in planes parallel to one another and spaced apart from one another.

16. The drive motor as claimed in claim 1, wherein, on at least one of the electrical connection regions between the base body and the receptacle arm, a support contour for supporting the at least one coil conductor at a distance to an inner surface, of the conductor receptacle is arranged on the connection region, so that the at least one coil conductor is not in touch contact with the connection region during energizing using the welding current.

17. The drive motor as claimed in claim 16, wherein the support contour is arranged on a component separate from the connecting unit.

18. The drive motor as claimed in claim 1, wherein an electrical connection region between the base body and the receptacle arm is arranged between two support contours of the stator, wherein the support contours support the at least one coil conductor at a distance to the input particular trough-shaped connection region.

19. A drive motor for a suction device or a machine tool in the form of a handheld power tool or a semi-stationary machine tool, wherein the drive motor includes a stator having an excitation coil assembly and a rotor having a motor shaft, which is rotatably mounted around a rotational axis on the stator or with respect to the stator by means of a bearing assembly, wherein the drive motor includes a connecting unit for electrically connecting the drive motor to an energizing unit for energizing the excitation coil assembly, wherein the connecting unit includes a base body for fastening on the stator and a receptacle arm protruding from the base body, between which a conductor receptacle for at least one electrical coil conductor of an excitation coil of the excitation coil assembly is formed, and wherein the connecting unit includes a connecting contact region for electrically connecting a connecting line for the connection to the energizing unit, and wherein the receptacle arm and the base body are connected to one another by means of two electrically conductive connection regions and form a receptacle eye enclosing the conductor receptacle in a ring shape, so that the conductor receptacle has a closed state, and a welding current between the base body and the receptacle arm can flow past the conductor receptacle via the electrical connection regions, and wherein the connecting unit includes, in the region of the conductor receptacle, an elongated support surface and a lateral narrow side angled thereto, wherein an oblique surface obliquely inclined to the support surface and to the narrow side for supporting the at least one coil conductor is arranged between the support surface and the narrow side.

20. A method for installing an electrical connecting unit of a drive motor for a suction device or a machine tool in the form of a handheld power tool or a semi-stationary machine tool, wherein the drive motor includes a stator having an excitation coil assembly and a rotor having a motor shaft, which is rotatably mounted around a rotational axis on the stator or with respect to the stator by means of a bearing assembly, wherein the drive motor includes a connecting unit for electrically connecting the drive motor to an energizing unit for energizing the excitation coil assembly, wherein the connecting unit includes a base body for fastening on the stator and a receptacle arm protruding from the base body, between which a conductor receptacle for at least one electrical coil conductor of an excitation coil of the excitation coil assembly is formed, and wherein the connecting unit includes a connecting contact region for electrically connecting a connecting line for the connection to the energizing unit, the method comprising:

inserting the at least one coil conductor into the conductor receptacle connecting the receptacle arm and the base body while forming two electrically conductive connection regions, so that the receptacle arm and the base body form a receptacle eye enclosing the conductor receptacle in a ring shape and the conductor receptacle has a closed state; and applying welding electrodes to the base body and the connection arm and energizing using a welding current, which flows via the electrical connection regions past the conductor receptacle between the base body and the receptacle arm, wherein, on at least one of the electrical connection regions, between the base body and the receptacle arm, a support contour for supporting the at least one coil conductor at a distance to an inner surface, of the conductor receptacle is arranged on the connection region, so that the at least one coil conductor is not in touch contact with the connection region during energizing using the welding current.

21. The method as claimed in claim 20, further comprising adjusting the receptacle arm out of a position spaced apart from the base body in which the conductor receptacle has an open state and is open on one side for inserting the coil conductor, into a position adjusted toward the base body, in which the conductor receptacle has the closed state.

22. The method as claimed in claim 20 further comprising partially deforming an end region of the receptacle arm in the direction of the base body in such a way that a free end of the receptacle arm is in touch contact with the base body to form one of the electrical connection regions before and during the energizing using the welding current.

\* \* \* \* \*